United States Patent
Miyata

(10) Patent No.: US 8,861,786 B2
(45) Date of Patent: Oct. 14, 2014

(54) ELECTRONIC CAMERA

(75) Inventor: Kazunori Miyata, Shijonawate (JP)

(73) Assignee: SANYO Electric Co., Ltd., Moriguchi-shi, Osaka (JP)

(*) Notice: Subject to any disclaimer, the term of this patent is extended or adjusted under 35 U.S.C. 154(b) by 339 days.

(21) Appl. No.: 13/316,005

(22) Filed: Dec. 9, 2011

(65) Prior Publication Data

US 2012/0148098 A1 Jun. 14, 2012

(30) Foreign Application Priority Data

Dec. 9, 2010 (JP) ................. 2010-274793

(51) Int. Cl.
*G06K 9/00* (2006.01)
*H04N 5/232* (2006.01)

(52) U.S. Cl.
CPC ....... *H04N 5/23219* (2013.01); *H04N 5/23293* (2013.01); *H04N 5/23222* (2013.01)
USPC ....................................... 382/103

(58) Field of Classification Search
None
See application file for complete search history.

(56) References Cited

U.S. PATENT DOCUMENTS

2005/0052538 A1* 3/2005 Sato et al. ............. 348/208.1
2010/0053323 A1* 3/2010 Izawa .................... 348/136

FOREIGN PATENT DOCUMENTS

| JP | 2007-329602 A | 12/2007 |
| JP | 2010-092066 A | 4/2010 |
| JP | 2010-109811 A | 5/2010 |
| JP | 2010-161704 A | 7/2010 |

* cited by examiner

*Primary Examiner* — Stephen R Koziol
*Assistant Examiner* — Amandeep Saini
(74) *Attorney, Agent, or Firm* — Westerman, Hattori, Daniels & Adrian, LLP

(57) ABSTRACT

An electronic camera includes an imager. An imager outputs an electronic image corresponding to an optical image captured on an imaging surface. A first generator generates a first notification forward of the imaging surface. A searcher searches for one or at least two face images each having a size exceeding a reference from the electronic image outputted from the imager. A controller controls a generation manner of the first generator with reference to an attribute of each of one or at least two face images detected by the detector.

8 Claims, 28 Drawing Sheets

(A) FRONT SURFACE (B) REAR SURFACE

DIC

| FACE PATTERN (FP_1) | FACE PATTERN (FP_2) | FACE PATTERN (FP_3) |
|---|---|---|
|  |  |  |
| FACE PATTERN (FP_4) | FACE PATTERN (FP_5) | FACE PATTERN (FP_6) |
|  |  |  |
| FACE PATTERN (FP_7) | FACE PATTERN (FP_8) | FACE PATTERN (FP_9) |
|  |  |  |
| ⋮ | ⋮ | ⋮ |

TBL1-TBL2

| No. | FACE POSITION | FACE SIZE |
|---|---|---|
| 1 | | |
| 2 | | |
| 3 | | |
| ⋮ | ⋮ | ⋮ |

(A) MONITOR SCREEN (B) LED LIGHT-EMISSION STATE (A) MONITOR SCREEN (B) LED LIGHT-EMISSION STATE (A) MONITOR SCREEN (B) LED LIGHT-EMISSION STATE (A) MONITOR SCREEN (B) LED LIGHT-EMISSION STATE

FIG.13

TBL3

| DETERMINATION REFERENCE | WEIGHTING |
|---|---|
| SIZE | 40 |
| POSITION | 30 |
| TILT | 15 |
| DIRECTION | 10 |
| SMILE DEGREE | 5 |

FIG.14

| DETERMINATION REFERENCE | FACE 1 | FACE 2 |
|---|---|---|
| SIZE | 30 | 10 |
| POSITION | 18 | 12 |
| TILT | 5 | 10 |
| DIRECTION | 5 | 5 |
| SMILE DEGREE | 3 | 2 |
| TOTAL | 61 | 39 |

ELECTRONIC CAMERA

CROSS REFERENCE OF RELATED APPLICATION

The disclosure of Japanese Patent Application No. 2010-274793, which was filed on Dec. 9, 2010, is incorporated here by reference.

BACKGROUND OF THE INVENTION

1. Field of the Invention

The present invention relates to an electronic camera. More particularly, the present invention relates to an electronic camera which detects a specific object image, such as a face image of a person, from a scene image captured by an imaging device.

2. Description of the Related Art

According to one example of this type of camera, a live view image based on a scene image repeatedly captured by an imaging device is displayed on an LCD monitor, and in parallel therewith, a face image is searched from the scene image of each frame. When the face image is discovered, a character representing a face frame structure is displayed on the LCD monitor in an OSD manner.

However, in the above-described camera, the character representing the face frame structure is displayed on the LCD monitor. Therefore, in a case that an operator is on a scene side in order to photograph an operator him/herself (so-called self shooting), it is not possible to confirm the character of the face frame structure, i.e., a detection state of the face image, and as a result, a operability is decreased.

SUMMARY OF THE INVENTION

An electronic camera according to the present invention, comprises: an imager which outputs an electronic image corresponding to an optical image captured on an imaging surface; a first generator which generates a first notification forward of the imaging surface; a searcher which searches for one or at least two face images each having a size exceeding a reference from the electronic image outputted from the imager; and a controller which controls a generation manner of the first generator with reference to an attribute of each of one or at least two face images detected by the detector.

According to the present invention, a computer program embodied in a tangible medium, which is executed by a processor of an electronic camera provided with an imager which outputs an electronic image corresponding to an optical image captured on an imaging surface, the program comprises: a first generating step of generating a first notification forward of the imaging surface; a searching step of searching for one or at least two face images each having a size exceeding a reference from the electronic image outputted from the imager; and a controlling step of controlling a generation manner of the first generating step with reference to an attribute of each of one or at least two face images detected by the detecting step.

According to the present invention, an imaging control method executed by an electronic camera provided with an imager which outputs an electronic image corresponding to an optical image captured on an imaging surface, comprises: a first generating step of generating a first notification forward of the imaging surface; a searching step of searching for one or at least two face images each having a size exceeding a reference from the electronic image outputted from the imager; and a controlling step of controlling a generation manner of the first generating step with reference to an attribute of each of one or at least two face images detected by the detecting step.

The above described features and advantages of the present invention will become more apparent from the following detailed description of the embodiment when taken in conjunction with the accompanying drawings.

BRIEF DESCRIPTION OF THE DRAWINGS

FIG. 13 is an illustrative view showing another example of the table referred to by the embodiment in FIG. 2;

FIG. 14 is an illustrative view showing one example of a main-face specifying process in an LED control task;

DETAILED DESCRIPTION OF THE PREFERRED EMBODIMENTS

Figure 1:
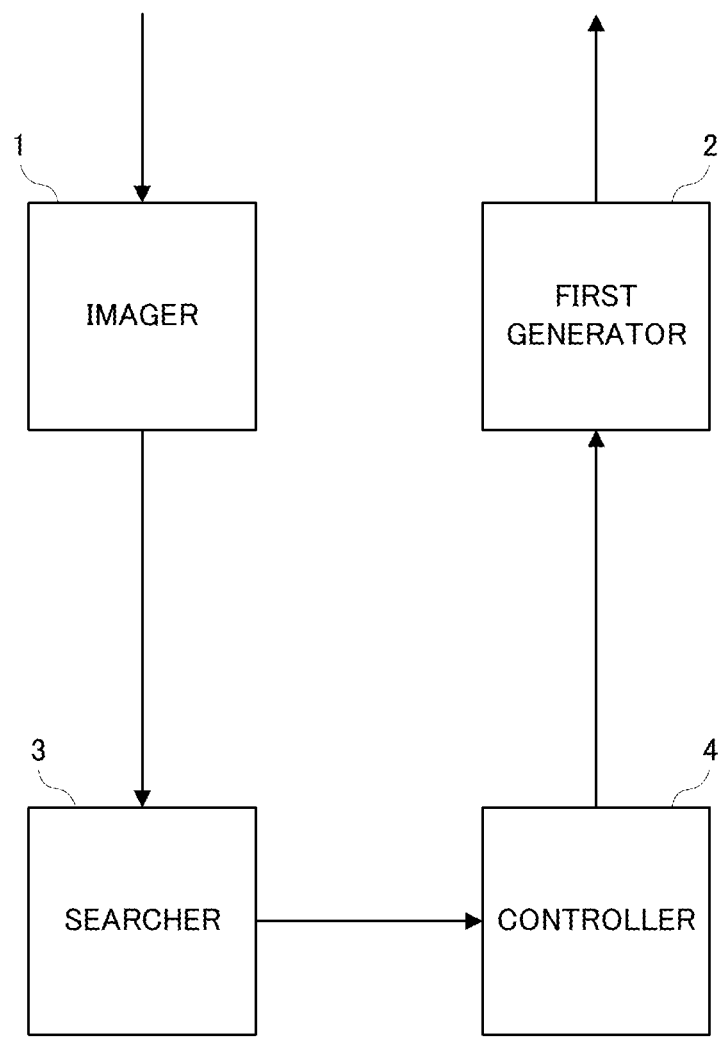
FIG. 1 is a block diagram showing a basic configuration of one embodiment of the present invention.

With reference to FIG. 1, an electronic camera according to one embodiment of the present invention is basically configured as follows: An imager 1 outputs an electronic image corresponding to an optical image captured on an imaging surface. A first generator 2 generates a first notification forward of the imaging surface. A searcher 3 searches for one or at least two face images each having a size exceeding a reference from the electronic image outputted from the imager 1. A controller 4 controls a generation manner of the first generator 2 with reference to an attribute of each of one or at least two face images detected by the detector 3.

Figure 2:
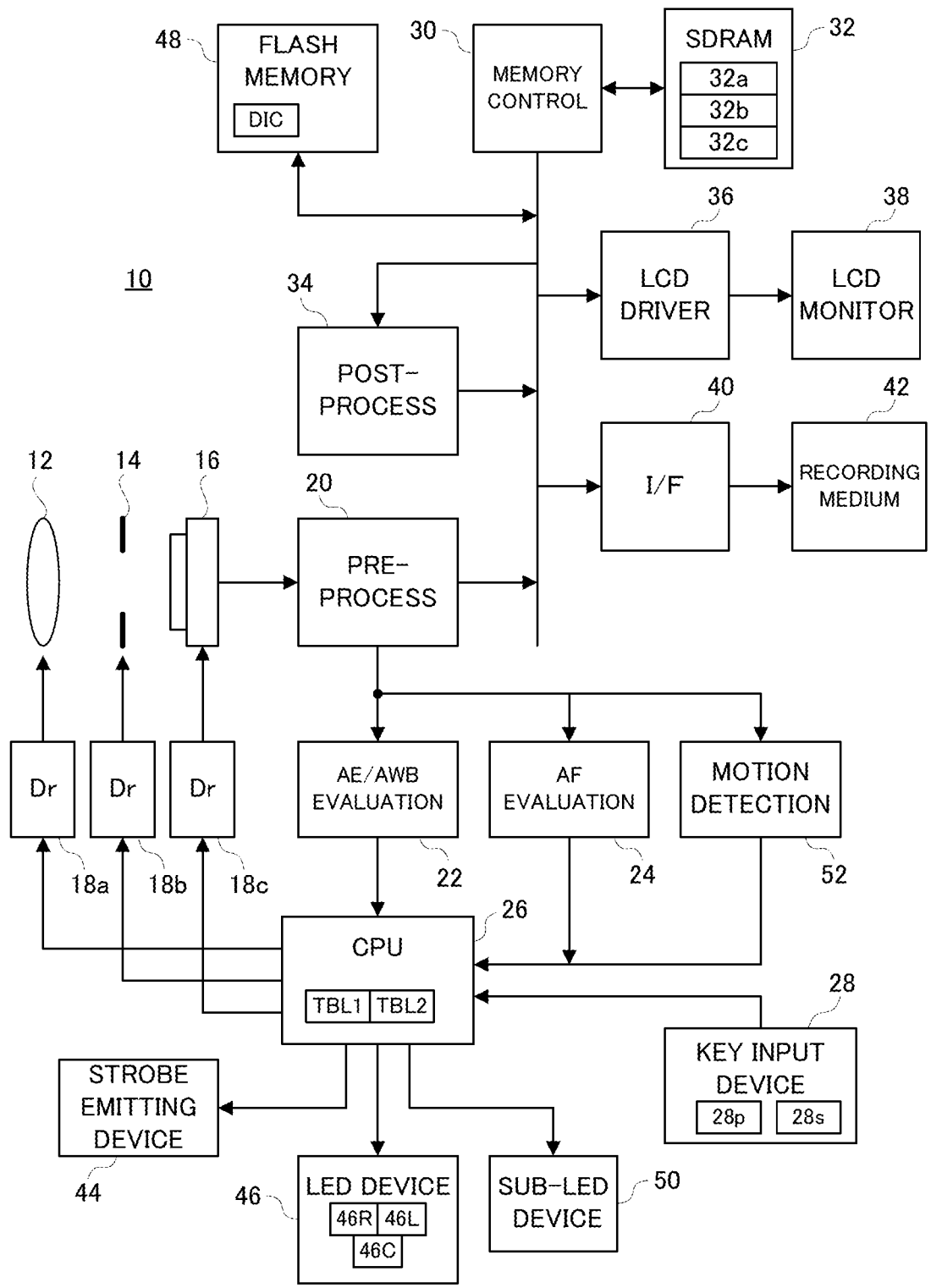
FIG. 2 is a block diagram showing a configuration of one embodiment of the present invention.

With reference to FIG. 2, a digital camera 10 according to one embodiment includes a focus lens 12 and an aperture unit 14 driven by drivers 18a and 18b, respectively. An optical image of a scene that underwent these components enters, with irradiation, an imaging surface of an imager 16, and is subjected to a photoelectric conversion. Thereby, electric charges representing a scene image are produced.

When a power key 28p on a key input device 28 is operated, in order to start a live-view image process under an imaging task, a CPU 26 commands a driver 18c to repeat an exposure procedure and a pixel-skipping reading-out procedure. In response to a vertical synchronization signal Vsync periodically generated from an SG (Signal Generator) not shown, the driver 18c exposes the imaging surface and reads out a part of the electric charges produced on the imaging surface in a raster scanning manner. From the imager 16, a low-resolution raw image signal that is based on the read-out electric charges is cyclically outputted.

A pre-processing circuit 20 performs processes, such as correlated double sampling, automatic gain control, A/D conversion and etc., on the raw image signal outputted from the imager 16 so as to output raw image data which is a digital signal. The outputted raw image data is written into a raw image area 32a of an SDRAM 32 through a memory control circuit 30.

A post-processing circuit 34 reads out the raw image data accommodated in the raw image area 32a through the memory control circuit 30, and performs processes, such as a white balance adjustment, a color separation, a YUV conversion and etc., on the read-out raw image data. YUV formatted-image data generated thereby is written into a YUV image area 32b of the SDRAM 32 through the memory control circuit 30.

An LCD driver 36 repeatedly reads out the image data accommodated in the YUV image area 32b through the memory control circuit 30, and drives an LCD monitor 38 based on the read-out image data. As a result, a real-time moving image (a live view image) of the scene is displayed on a monitor screen.

Figure 3:
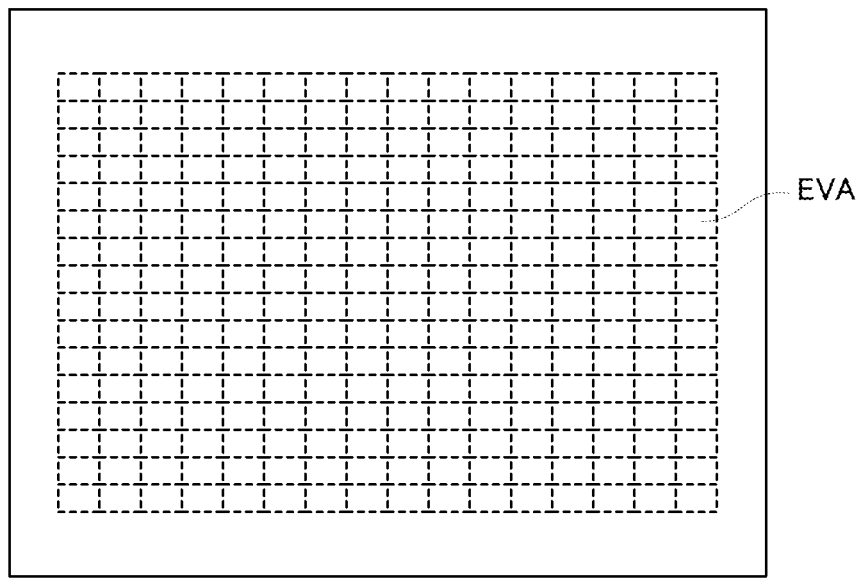
FIG. 3 is an illustrative view showing one example of a state that an evaluation area is allocated to an imaging surface.

With reference to FIG. 3, an evaluation area EVA is allocated to a center of the imaging surface. The evaluation area EVA is divided into 16 portions in each of a horizontal direction and a vertical direction; therefore, 256 divided areas form the evaluation area EVA. Moreover, in addition to the above-described processes, the pre-processing circuit 20 executes a simple RGB converting process which simply converts the raw image data into RGB data.

An AE/AWB evaluating circuit 22 integrates RGB data belonging to the evaluation area EVA, out of the RGB data produced by the pre-processing circuit 20, at every time the vertical synchronization signal Vsync is generated. Thereby; 256 integral values (256 AE/AWB evaluation values) are outputted from the AE/AWB evaluating circuit 22 in response to the vertical synchronization signal Vsync.

Moreover, an AF evaluating circuit 24 extracts a high-frequency component of G data belonging to the same evaluation area EVA, out of the RGB data outputted from the pre-processing circuit 20, and integrates the extracted high-frequency component at every time the vertical synchronization signal Vsync is generated. Thereby, 256 integral values (256 AF evaluation values) are outputted from the AF evaluating circuit 24 in response to the vertical synchronization signal Vsync.

The CPU 26 executes an AE/AWB process for a live view image that is based on output from the AE/AWB evaluating circuit 22 in parallel with the live-view image process so as to calculate an appropriate EV value and an appropriate white balance adjustment gain. An aperture amount and an exposure time period that define the calculated appropriate EV value are set to the drivers 18b and 18c, respectively. Moreover, the calculated appropriate white balance adjustment gain is set to the post-processing circuit 34. Thereby, a brightness and a white balance of a live view image is adjusted approximately.

Moreover, under a continuous AF task parallel with the live-view image process, the CPU 26 executes an AF process for a live view image that is based on output from the AF evaluating circuit 24. When the output of the AF evaluating circuit 24 satisfies an AF start-up condition, the focus lens 12 is set to a focal point by the driver 18a. Thereby, a focus of a live view image is adjusted approximately.

When a shutter button 28s is half-depressed, the CPU 26 interrupts the continuous AF task, and executes an AF process for recording under the imaging task. Also the AF process for recording is executed based on the output of the AF evaluating circuit 24. Thereby, the focus is adjusted strictly. Subsequently the CPU 26 executes an AE process for recording based on output of the AE/AWB evaluating circuit 22 so as to calculate an optimal EV value. Similar to the case described above, an aperture amount and an exposure time period that define the calculated optimal EV value are set to the drivers 18b and 18c, respectively. As a result, the brightness of the live view image is adjusted strictly When the shutter button 28s is fully depressed, the CPU 26 commands the driver 18c to execute, for a recording process, the exposure procedure and an all-pixel reading procedure once each, and further starts up an OF 40. The driver 18c exposes the imaging surface in response to the vertical synchronization signal Vsync, and reads out all of the electric charges produced thereby from the imaging surface in a raster scanning manner. From the imager 16, one-frame of a raw image signal having a high resolution is outputted.

The raw image signal outputted from the imager 16 is converted into raw image data by the pre-processing circuit 20, and the converted raw image data is written into the raw image area 32a of the SDRAM 32 by the memory control circuit 30. As a result, one frame of the raw image data at a time point at which the shutter button 28s is fully depressed is taken into the raw image area 32a.

Moreover, if a scene is dark, the optimal EV value exceeds an upper limit value of a settable range, and thereby, an exposure amount may becomes insufficient. In such a case, the CPU 26 drives a strobe emitting device 44 immediately before a still-image taking process. As a result, the image data taken into the raw image area 32c represents a scene at a time point at which the scene is exposed to a flash light of the strobe emitting device 44.

The CPU 26 calculates an optimal white balance adjustment gain based on the raw image data accommodated in the raw image area 32a so as to set the calculated optimal white balance adjustment gain to the post-processing circuit 34. The post-processing circuit 34 reads out the raw image data accommodated in the raw image area 32a through the memory control circuit 30, converts the read-out raw image data into YUV formatted-image data having an optimal white balance, and writes the converted image data into a recording image area 32c through the memory control circuit 30.

The I/F 40 reads out the image data thus accommodated in the recording image area 32c through the memory control circuit 30 so as to record the read-out image data in a file format on a recording medium 42.

It is noted that, the live-view image process is resumed at a time point at which the raw image data having a high resolution is secured in the recording image area 32c. Also the continuous AF task is re-started at this time point.

Figure 4:
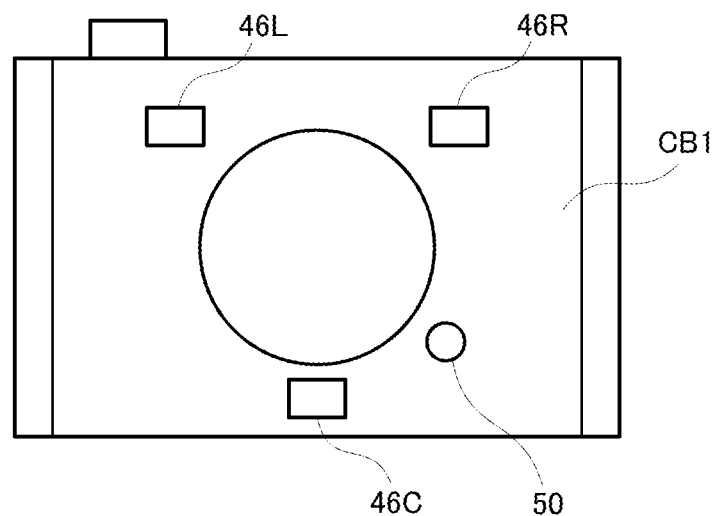
FIG. 4(A) is an illustrative view showing one example of a state that an electronic camera of the embodiment in FIG. 2 is viewed from a front.
FIG. 4(B) is an illustrative view showing one example of a state that the electronic camera of the embodiment in FIG. 2 is viewed from a rear.
Figure 4:
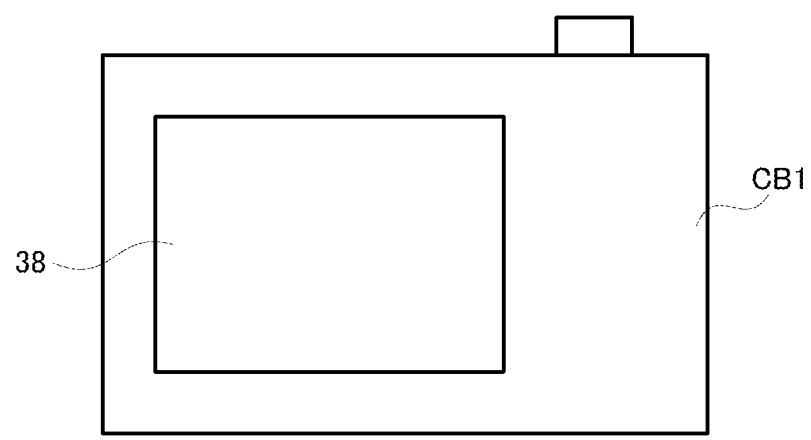

Under a sub-LED control task parallel with the above-described imaging task, the CPU 26 controls a light-emitting operation of a sub-LED device 50 arranged on a front surface of a camera housing CB1 as shown in FIG. 4(A). It is noted that, the LCD monitor 38 is arranged on a rear surface of the camera housing CB1 as shown in FIG. 4(B). Thus, the sub-LED device 50 emits light toward a front of the camera housing CB1, and the LCD monitor 38 displays an image toward a rear of the camera housing CB1.

In the sub-LED controlling task, when the shutter button 28s is in an operated state (half-depressed state), the CPU 26 determines whether or not the strobe emitting device 44 is expected to be driven immediately before the still-image taking process. When it is determined that a scene is dark and a strobe emission is needed or when a forced emission is set, the sub-LED device 50 is started to light up in order to give a notice of the strobe emission.

Moreover, in the sub-LED controlling task, when the shutter button 28s is in an operated state (half-depressed state), the CPU 26 determines whether or not a camera shake is occurred. When it is determined that the camera shake is occurred as a result of a motion vector of an imaging surface detected by a motion detecting circuit 52 being taken by the CPU 26 and compared with a threshold value, the sub-LED device 50 is started to blink in order to notify an occurrence of the camera shake.

The sub-LED device 50 in a lighting state or a blinking state is turned off by cancelling a half-depressed state or a fully-depressed state of the shutter button 28s. Under a face detecting task executed in parallel with the live-view image process, the CPU 26 repeatedly searches for a face image of a person from raw image data having a low-resolution accommodated in the raw image area 32a of the SDRAM 32. For the face detecting task, a dictionary DIC shown in FIG. 5, a plurality of face-detection frame structures FD_1, FD_2, FD_3, . . . shown in FIG. 6, and two tables TBL1 and TBL2 shown in FIG. 7 are prepared.

Figure 5:
FIG. 5 is an illustrative view showing one example of a dictionary referred to in the embodiment in FIG. 2.
Figure 5:
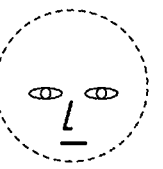
Figure 5:
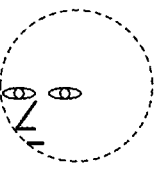
Figure 5:
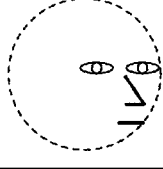
Figure 5:
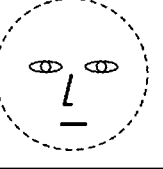
Figure 5:
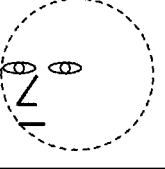
Figure 5:
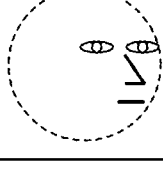
Figure 5:
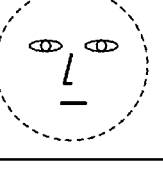
Figure 5:
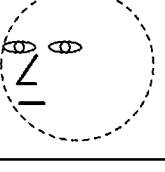
Figures 6, 7:
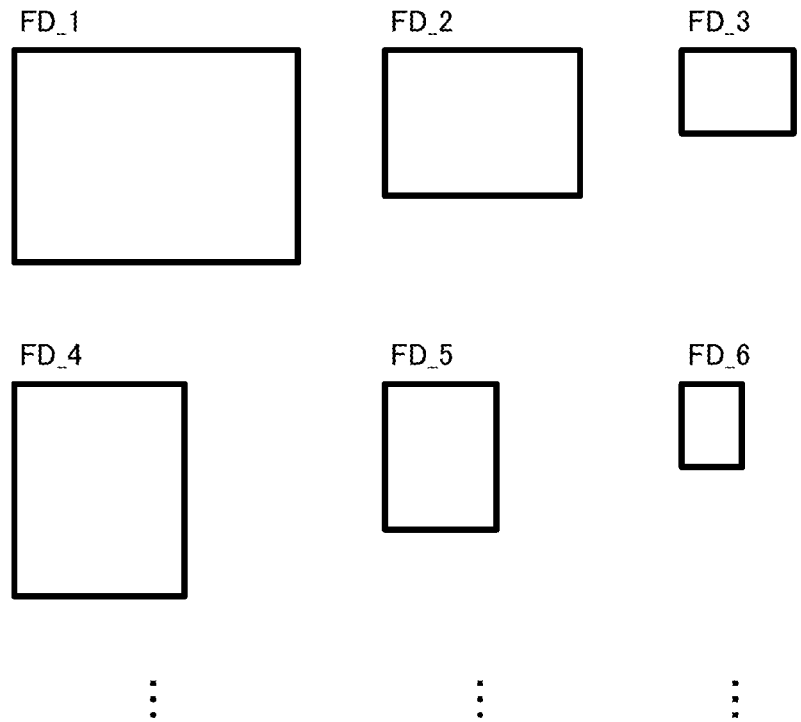
FIG. 6 is an illustrative view showing one example of a plurality of face-detection frame structures used for a face recognition process.
FIG. 7 is an illustrative view showing one example of a table referred to by the embodiment in FIG. 2.

According to FIG. 5, a plurality of face patterns FP_1, FP_2, . . . are registered in the dictionary DIC. Moreover, according to FIG. 6, the face-detection flame structures FD_1, FD_2, FD_3, . . . have shapes and/or dimensions different to one another. Furthermore, each of the tables TBL1 and TBL2 shown in FIG. 7 is equivalent to a table on which face-frame-structure information is written, and is formed by a column in which a position of the face image (position of the face-detection frame structure at a time point at which the face image is detected) is written and a column in which a size of the face image (size of the face-detection frame structure at a time point at which the face image is detected) is written.

In the face detecting task, firstly, the table TBL1 is designated as a current frame table on which the face-frame-structure information of a current frame is held. However, the designated table is updated between the tables TBL1 and TBL2 for each frame. In a subsequent frame, the current frame table is a prior frame table. Upon completion of designating the current frame table, a variable K is set to "1" and a face-detection frame structure K is set to an upper left of the evaluation area EVA shown in FIG. 3, i.e., a face-detection beginning position.

When the vertical synchronization signal Vsync is generated, out of the current-frame raw image data accommodated in the raw image area 32a of the SDRAM 32, partial image data belonging to the face-detection frame structure FD_K is compared with each of a plurality of face patterns FP_1,FP_2, . . . described in the dictionary DIC shown in FIG. 5. When it is determined that a partial image to be noticed matches any one of the face patterns, a current position and a size of the face-detection frame structure FD_K are described on the current frame table as the face-frame-structure information.

Figure 8:
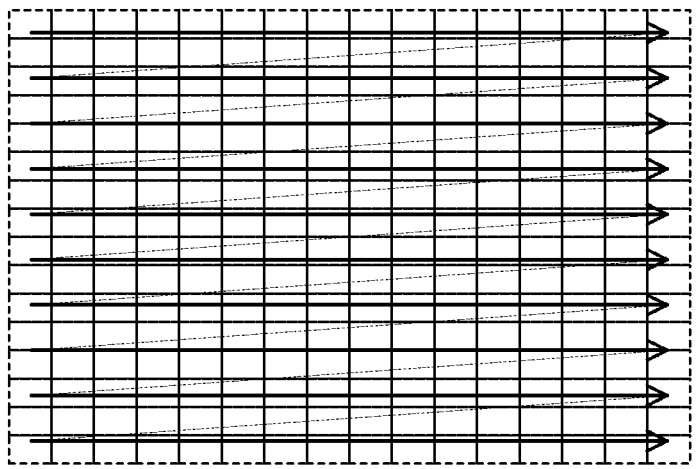
FIG. 8 is an illustrative view showing one portion of face detecting behavior.

The face-detection frame structure FD_K is moved by each predetermined amount in a raster direction as shown in FIG. 8, and subjected to the above-described comparing process at a plurality of positions on the evaluation area EVA. Then, at each time the face image of a person is discovered, the face-frame-structure information corresponding to the discovered face image (i.e., the current position and the size of the face-detection frame structure FD_K) is described one after another on the current frame table.

When the face-detection frame structure FD_K reaches a lower right of the evaluation area EVA, i.e., a face-detection ending position, the variable K is updated, and the face-detection frame structure FD_K corresponding to a value of the updated variable K is re-placed at the face-detection beginning position. Similarly to the above-described case, the face-detection frame structure FD_K is moved in a raster direction on the evaluation area EVA, and the face-frame-structure information corresponding to the face image detected by the comparing process is described on the current frame table. Such a face recognizing process is repeatedly executed until the face-detection frame structure FD_Kmax (Kmax: a number of the face-detection frame structure at a tail end) reaches the face-detection ending position.

When the face-detection frame structure FD_Kmax reaches the face-detection ending position, the LCD driver 36 is commanded to display a face-frame-structure character based on the face-frame-structure information described on the current frame table. The LCD driver 36 displays the face-frame-structure character according to the command, on the LCD monitor 38 in an OSD manner.

Upon completion of the display process of the face-frame-structure character, the designated table is updated and the updated designated table is initialized. Moreover, the variable K is set to "1". A face recognizing process of a subsequent frame is started in response to the generation of the vertical synchronization signal Vsync.

In parallel with the face detecting task, the CPU 26 defines a position and a shape of a parameter adjustment area ADJ referred to for the AE/AWB process and the AF process, under an adjustment-area control task.

In the adjustment-area control task, the prior frame table on which the face-frame-structure information is finalized is designated in response to the generation of the vertical synchronization signal Vsync, and whether or not the face-frame-structure information is described on the prior frame table is determined.

When at least one face frame structure is described on the prior frame table, a partial divided area covering an area within the face frame structure, out of the 256 divided areas forming the evaluation area EVA, is defined as the parameter adjustment area ADJ. On the other hand, when no face frame structure is described on the prior frame table, the whole evaluation area EVA is defined as the parameter adjustment area ADJ.

The above-described AE/AWB process for a live view image and the AE/AWB process for recording are executed based on the AE/AWB evaluation values belonging to the parameter adjustment area ADJ, out of the 256 AE/AWB evaluation values outputted from the AE/AWB evaluating circuit 22. Moreover, also the AF process for a live view image and the AF process for recording are executed based on the AF evaluation values belonging to the parameter adjustment area ADJ, out of the 256 AF evaluation values outputted from the AF evaluating circuit 24. Thereby, an adjustment accuracy of imaging parameters such as an exposure amount and a focus is improved.

Moreover, the CPU 26 controls light-emitting operations of LED devices 46R, 46L and 46C arranged on the front surface of the camera housing CB1 as shown in FIG. 4(A), under an LED control task parallel with the above-described imaging task. It is noted that the LED devices 46R, 46L and 46C is lit up or blinked forward of the camera housing CB1.

In the LED control task, the prior frame table on which the face-frame-structure information is finalized is designated in response to the generation of the vertical synchronization signal Vsync, and a face frame structure of which size exceeds a reference is detected.

When no face frame structure is detected, the LED devices 46R, 46L and 46C are turned off. When the number of the detected face frame structures is equal to or more than three, all of the LED devices 46R, 46L and 46C are lit up.

When the number of the detected face frame structures is one or two, a process of specifying any of the face frame structures as a main face is executed. In a main-face specifying process, firstly it is determined whether or not the number of the detected face frame structures is two. When the number of the detected face frame structures is one, a face of the first face frame structure is specified the main face.

Figure 9:
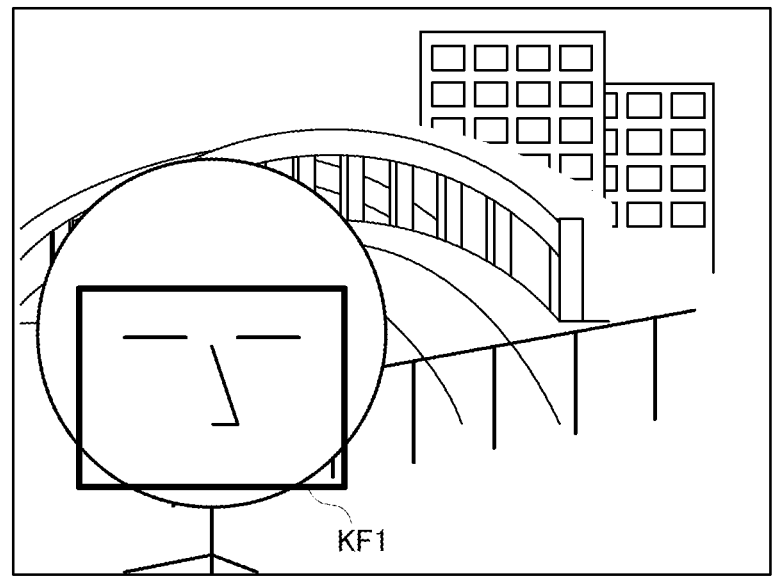
FIG. 9(A) is an illustrative view showing one example of a scene image displayed on a monitor screen.
FIG. 9(B) an illustrative view showing one example of a light-emission state of an LED device.
Figure 9:
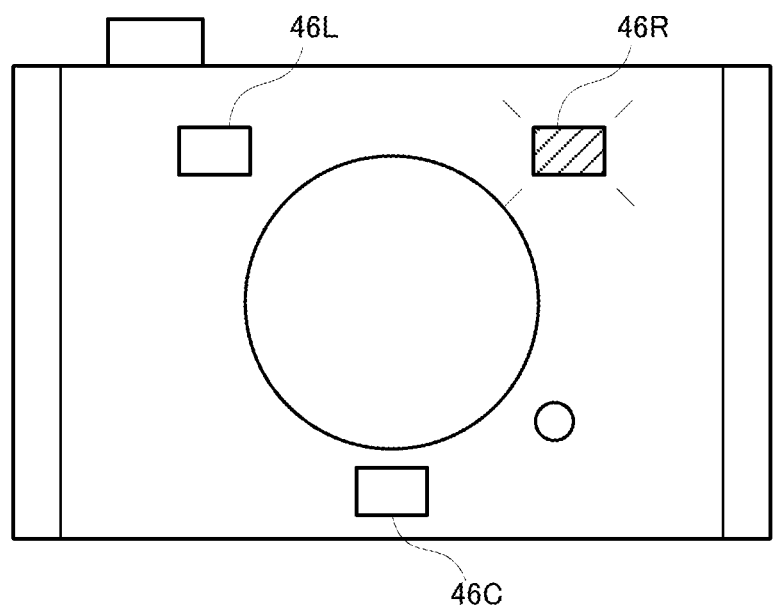

As shown in FIG. 9(A), when a main face captured by a face frame structure KF1 is located on a right side from a face side to a surface extending in a vertical direction including an optical axis of the digital camera 10, the CPU 26 blinks the LED device 46R as shown in FIG. 9(B).

Figure 10:
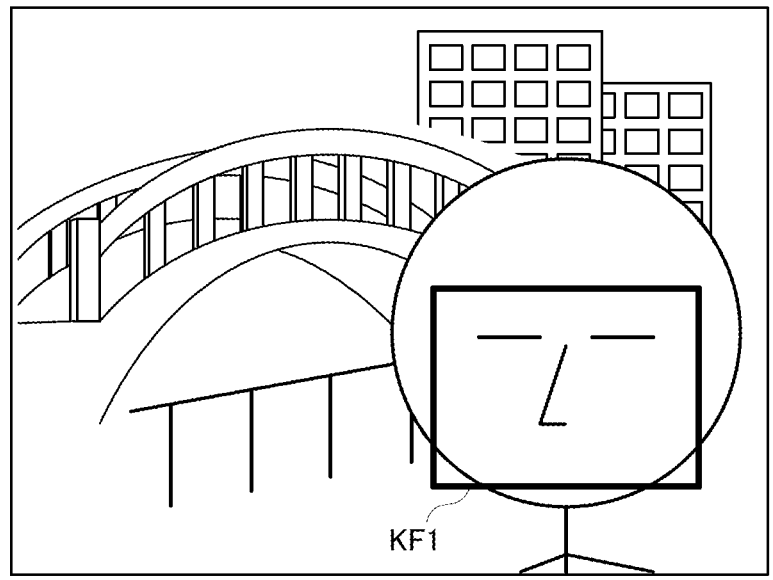
FIG. 10(A) is an illustrative view showing another example of the scene image displayed on the monitor screen.
FIG. 10(B) an illustrative view showing another example of the light-emission state of the LED device.
Figure 10:
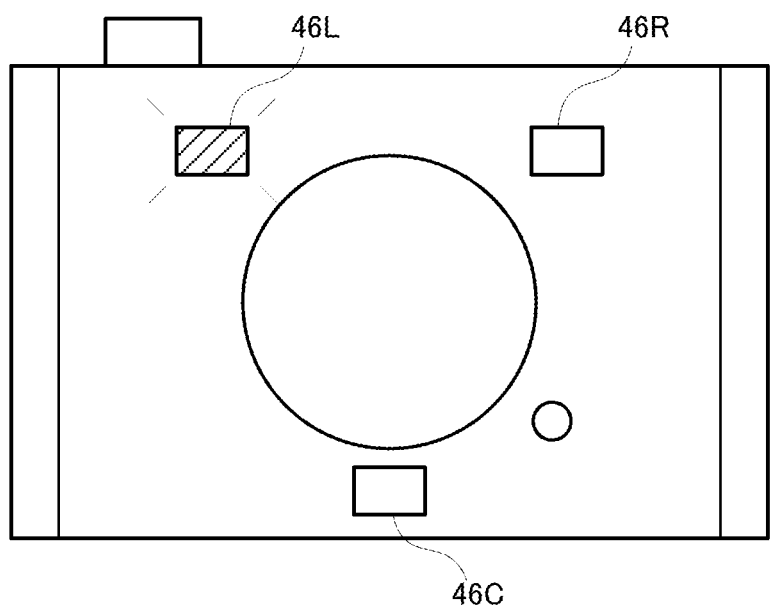

As shown in FIG. 10(A), when a main face captured by the face frame structure KF1 is located on a left side from a face side to the surface extending in the vertical direction including the optical axis of the digital camera 10, the CPU 26 blinks the LED device 46L as shown in FIG. 10(B).

Figure 11:
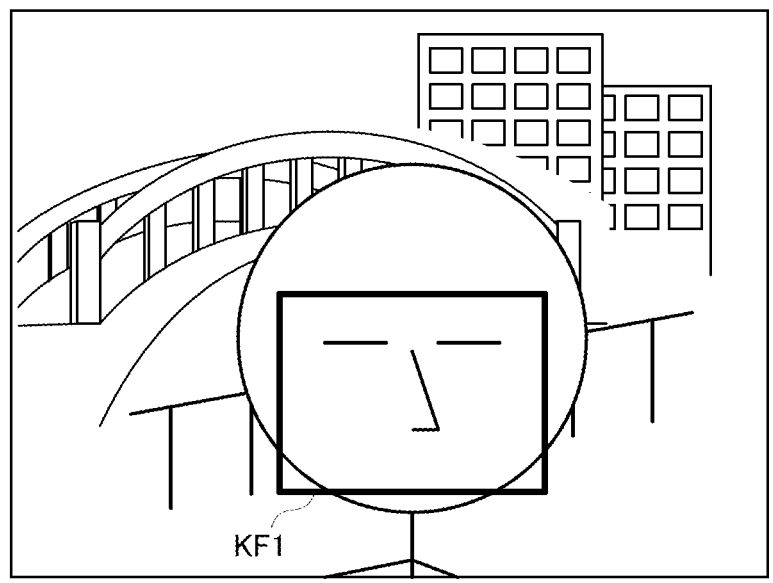
FIG. 11(A) is an illustrative view showing still another example of the scene image displayed on the monitor screen.
FIG. 11(B) an illustrative view showing still another example of the light-emission state of the LED device.
Figure 11:
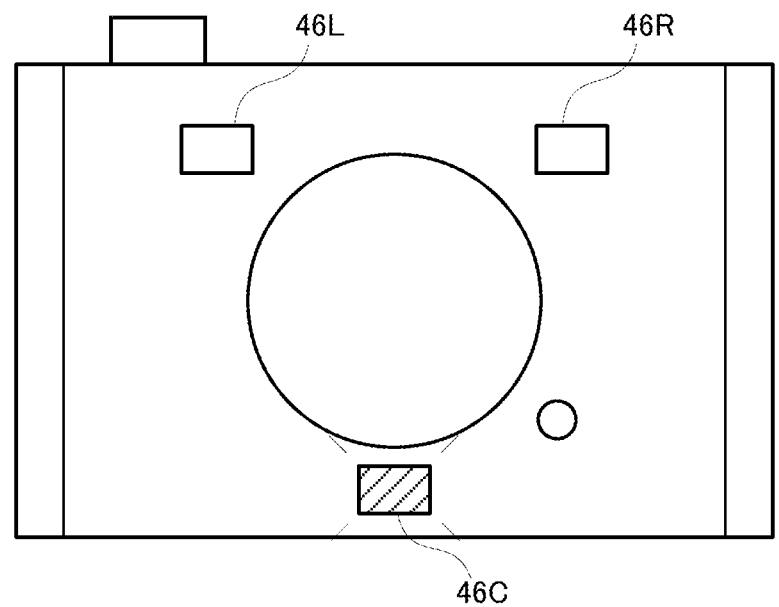

As shown in FIG. 11(A), when a main face captured by the face frame structure KF1 is located near the surface extending in the vertical direction including the optical axis of the digital camera 10, the CPU 26 blinks the LED device 46C as shown in FIG. 11(B).

Figure 12:
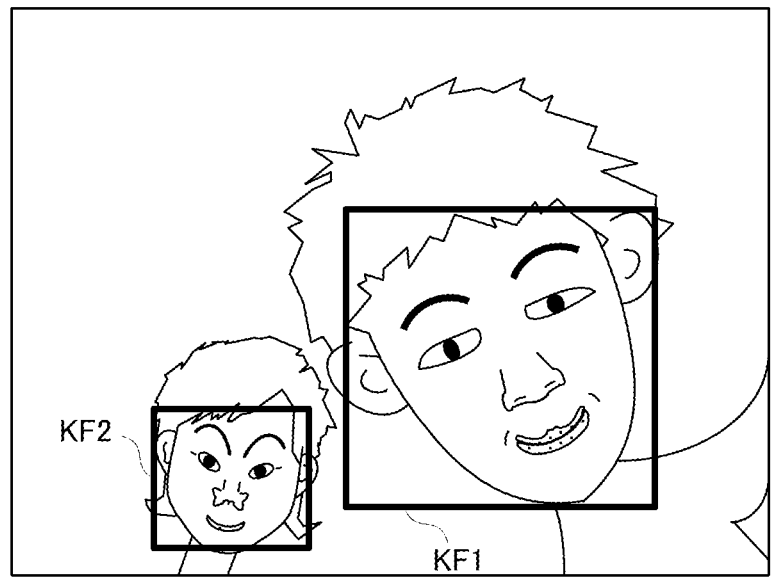
FIG. 12(A) is an illustrative view showing yet another example of the scene image displayed on the monitor screen.
FIG. 12(B) an illustrative view showing yet another example of the light-emission state of the LED) device.
Figure 12:
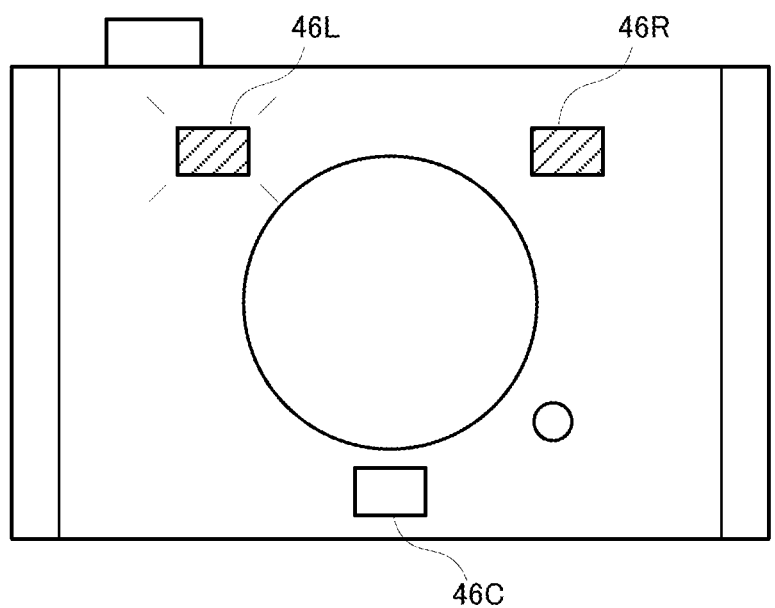

When the number of face frame structures detected as shown in FIG. 12(A) is two, in the main face specifying process, in order to use as a determination reference of specifying a main face, calculated are a size of a face frame structure, a position of a face frame structure, a tilt of a face, a direction of a face and a smile degree with respect to each of a face 1 captured by the face frame structure KF1 and a face 2 captured by the face frame structure KF2. It is noted that, with regard to a position of the face frame structure, a distance from a center of the imaging surface to a center of the face frame structure is calculated.

To each of these attributes, a mutually different weighting is set. For such a weighting setting, a table TBL3 shown in FIG. 13 is prepared. With reference to FIG. 13, a numeral "40" is applied to a size of a face frame structure, a numeral "30" is applied to a position of a face frame structure, a numeral "15" is applied to a tilt of a face, a numeral "10" is applied to a direction of a face and a numeral "5" is applied to a smile degree. This represents that the size of the face frame structure, the position of the face frame structure, the tilt of the face, the direction of the face and the smile degree are emphasized in order upon specifying a main face.

Moreover, these weightings are allocated based on a relative ratio of each attribute between a value calculated regarding the face 1 and a value calculated regarding the face 2. Regarding a size of a face frame structure, the larger the size is, the more a weighting is allocated, and regarding a position of a face frame structure, the shorter a distance from the center of the imaging surface to the center of the face frame structure, the more a weighting is allocated. Regarding a tilt of a face, the smaller the tilt is, the more a weighting is allocated, and regarding a direction of a face, the more a face turns to a front of the digital camera 10, the more a weighting is allocated. Regarding a smile degree, the higher a calculated value is, the more a weighting is allocated.

As a result of such an allocation, when a total sum of the weighting allocated to the face 1 is equal to or more than a total sum of the weighting allocated to the face 2, the CPU 26 specifies the face 1 as a main face. When a total sum of the weighting allocated to the face 1 falls below a total sum of the weighting allocated to the face 2, the CPU 26 specifies the face 2 as a main face.

According to an example shown in FIG. 12(A), a relative ratio between a size of the face frame structure KF1 and a size of the face frame structure KF2 is "3:1", and therefore, out of a weighting of "40", a numeral "30" is allocated to the face 1 and a numeral "10" is allocated to the face 2 with reference to FIG. 14. A relative ratio between a position of the face frame structure KF1 (a distance from a center of the imaging surface to a center of the face frame structure KF1) and a position of the face frame structure KF2 (a distance from a center of the imaging surface to a center of the face frame structure KF2) is "2:3", and therefore, out of a weighting of "30", a numeral "18" is allocated to the face 1 and a numeral "12" is allocated to the face 2 with reference to FIG. 14.

A relative ratio between a tilt of the face 1 and a tilt of the face 2 to the vertical direction on the imaging surface is "2:1", and therefore, out of a weighting of "15", a numeral "5" is allocated to the face 1 and a numeral "10" is allocated to the face 2 with reference to FIG. 14. A relative ratio between an angle of a face direction of the face 1 and an angle of a face direction of the face 2 to the digital camera 10 is "1:1", and therefore, out of a weighting of "10", a numeral "5" is allocated to each of the face frame structures with reference to FIG. 14. A relative ratio between a smile degree of the face frame structure KF1 and a smile degree of the face frame structure KF2 is "3:2", and therefore, out of a weighting of "5", a numeral "3" is allocated to the face 1 and a numeral "2" is allocated to the face 2 with reference to FIG. 14.

As a result of such an allocation, a total sum of the weighting allocated to the face 1 is "61", and a total sum of the weighting allocated to the face 2 is "39". Thus, the total sum of the face 1 is equal to or more than the total sum of the face 2, and therefore, according to an example shown in FIG. 12(A), the CPU 26 specifies the face 1 captured by the face frame structure KF1 as a main face.

Upon completion of a control of the LED devices 46R, 46L and 46C for the main face, the CPU 26 executes a control of the LED devices 46R, 46L and 46C for a sub face (=a face other than the main face).

When a sub face is located on a right side from a face side to the surface extending in the vertical direction including the optical axis of the digital camera 10, the CPU 26 lights up the LED device 46R. When a sub face is located on a left side from a face side to the surface extending in the vertical direction including the optical axis of the digital camera 10, the CPU 26 lights up the LET) device 46L. When a sub face is located near the surface extending in the vertical direction including the optical axis of the digital camera 10, the CPU 26 lights up the LED device 46C.

According to an example shown in FIG. 12(A), a main face captured by the face frame structure KF1 is located on a left side from a face side to the surface extending in the vertical direction including the optical axis of the digital camera 10, and a sub face captured by the face frame structure KF2 is located on a right side from a face side. Thus, as shown in FIG. 12(B), the CPU 26 blinks the LED device 46L and lights up the LED device 46R.

Figure 15:
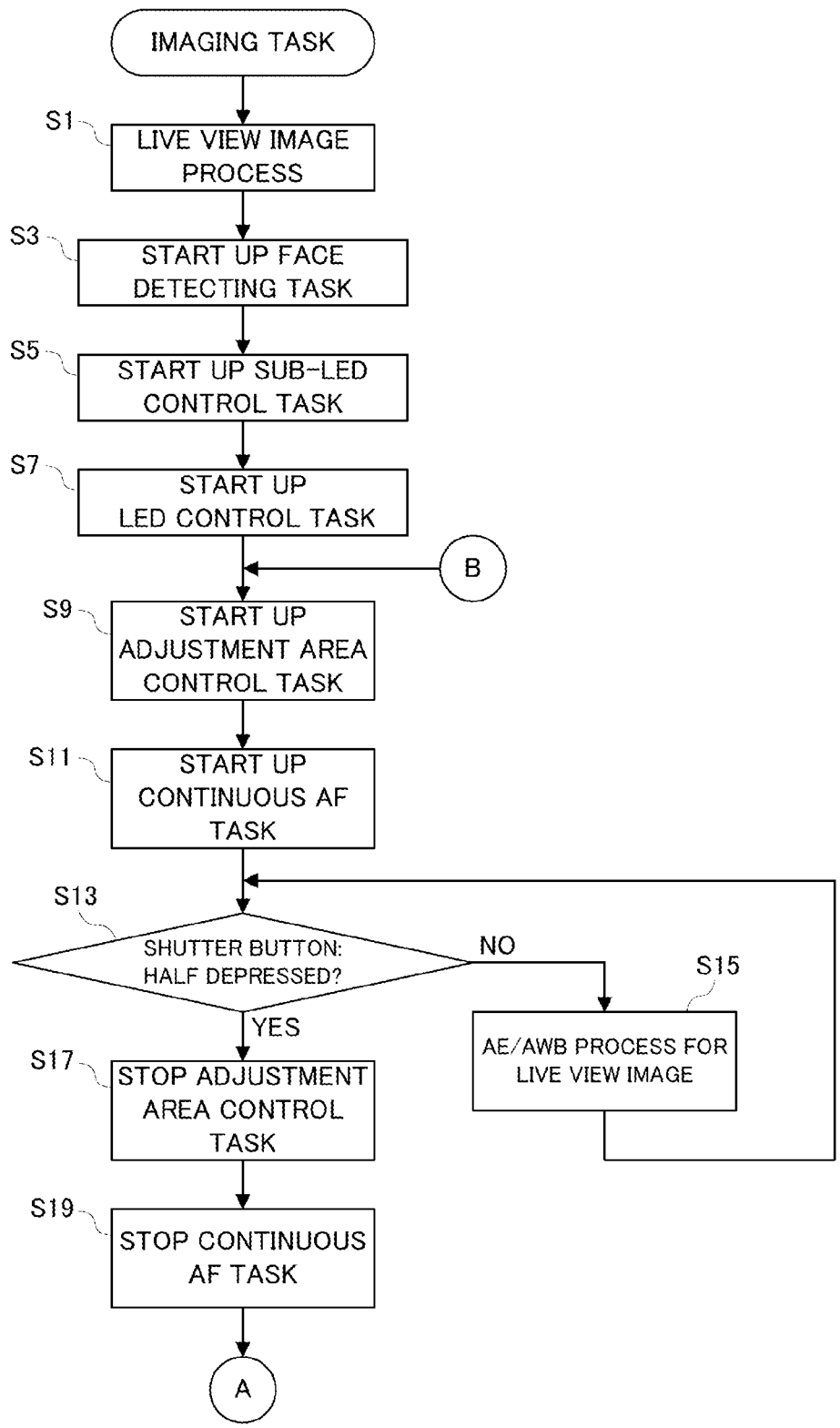
FIG. 15 is a flowchart showing one portion of behavior of a CPU applied to the embodiment in FIG. 2.
Figure 16:
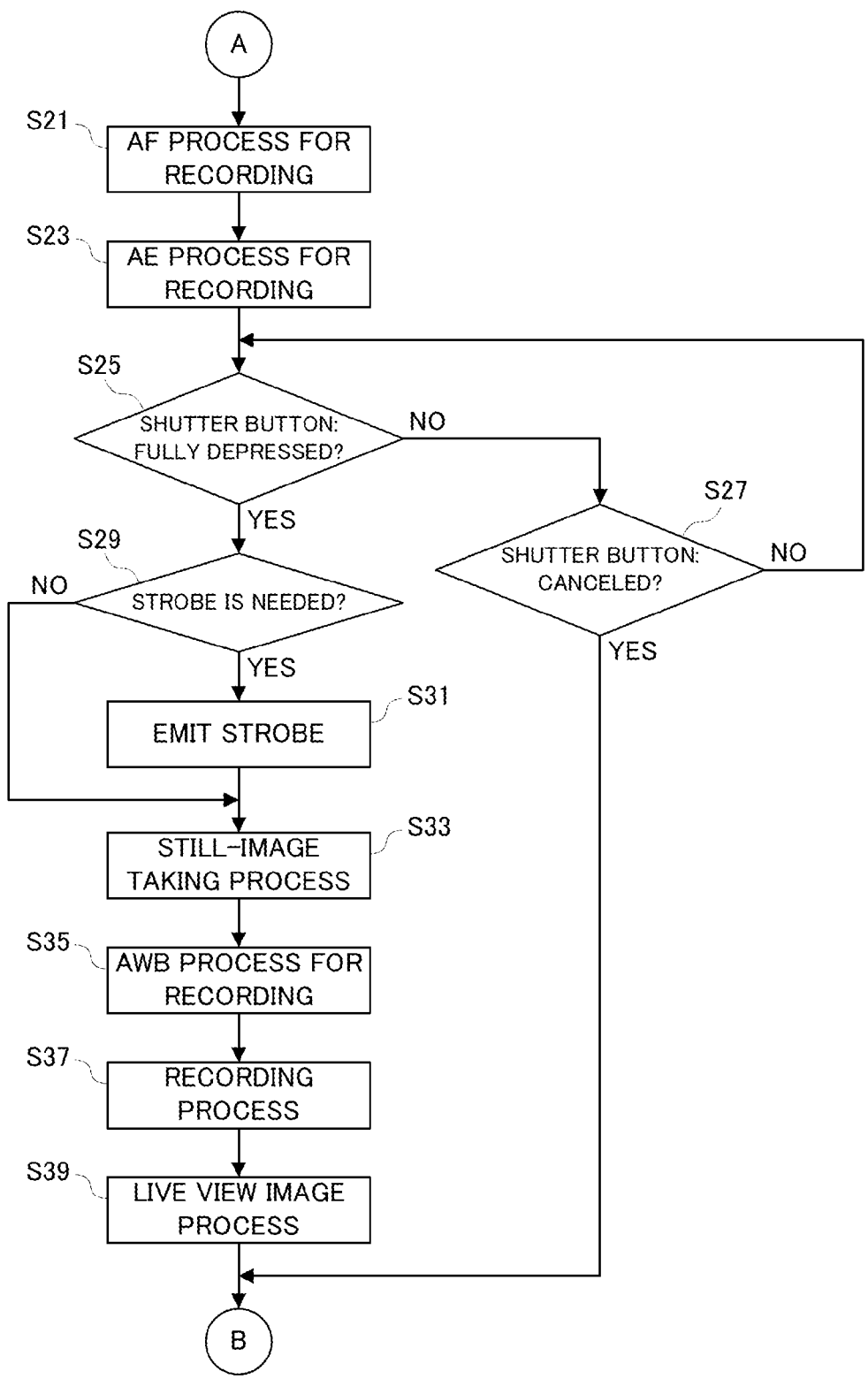
FIG. 16 is a flowchart showing another portion of behavior of the CPU applied to the embodiment in FIG. 2.
Figure 17:
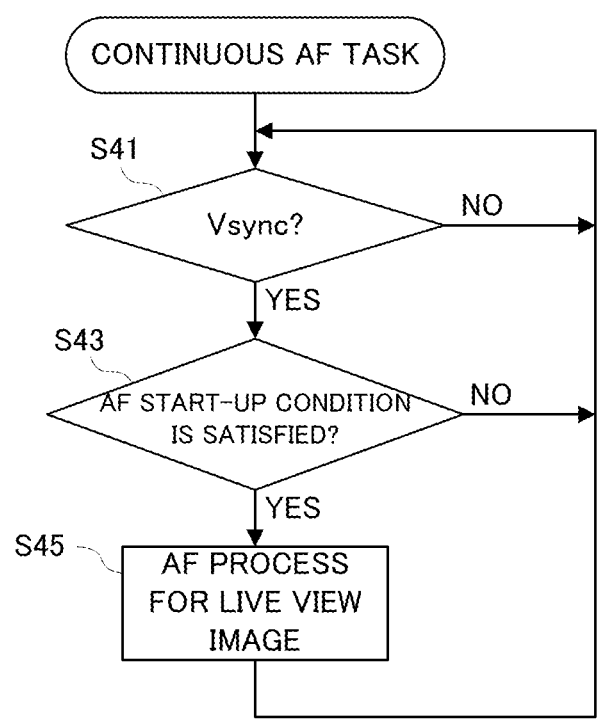
FIG. 17 is a flowchart showing still another portion of behavior of the CPU applied to the embodiment in FIG. 2.
Figure 18:
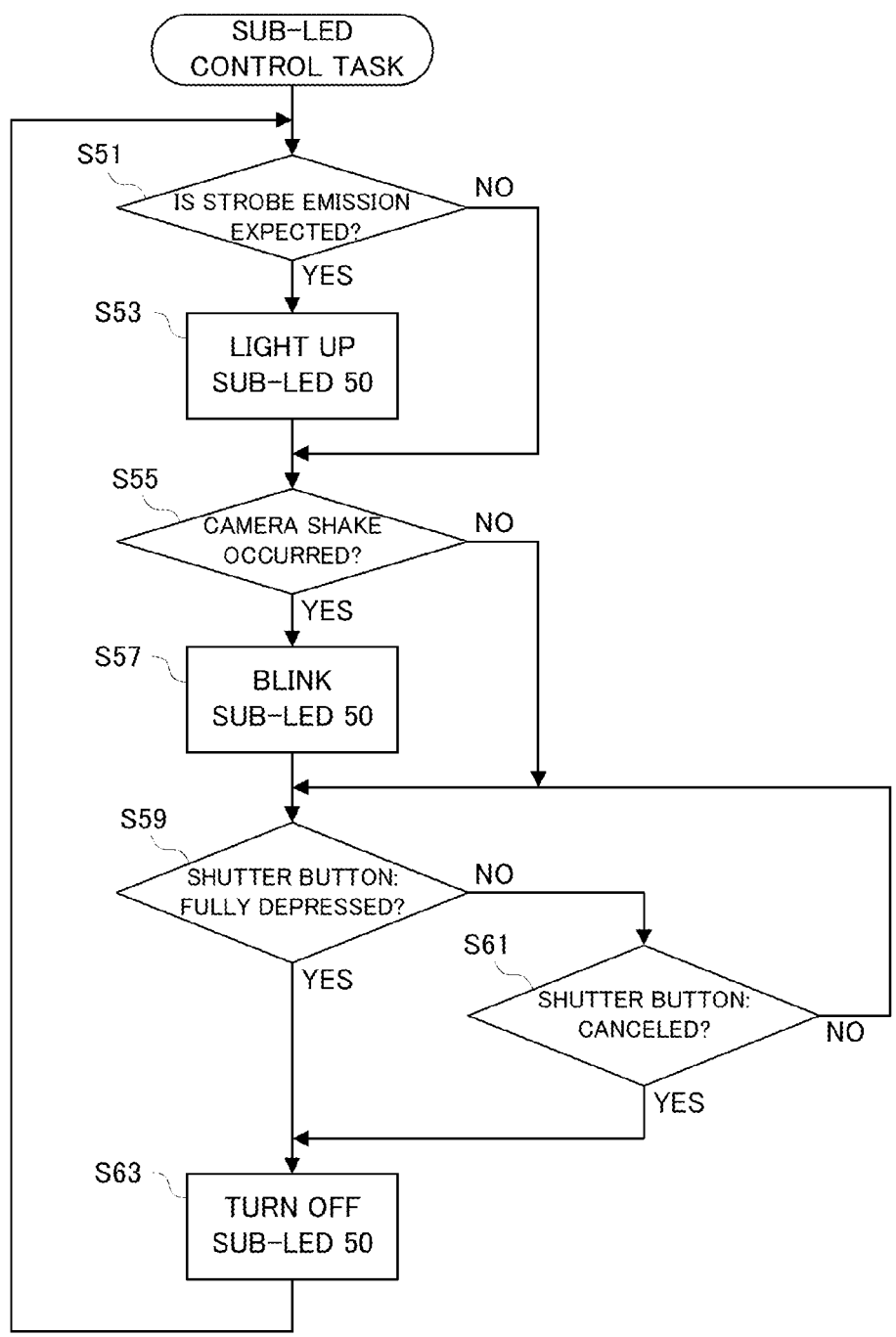
FIG. 18 is a flowchart showing yet another portion of behavior of the CPU applied to the embodiment in FIG. 2.
Figure 19:
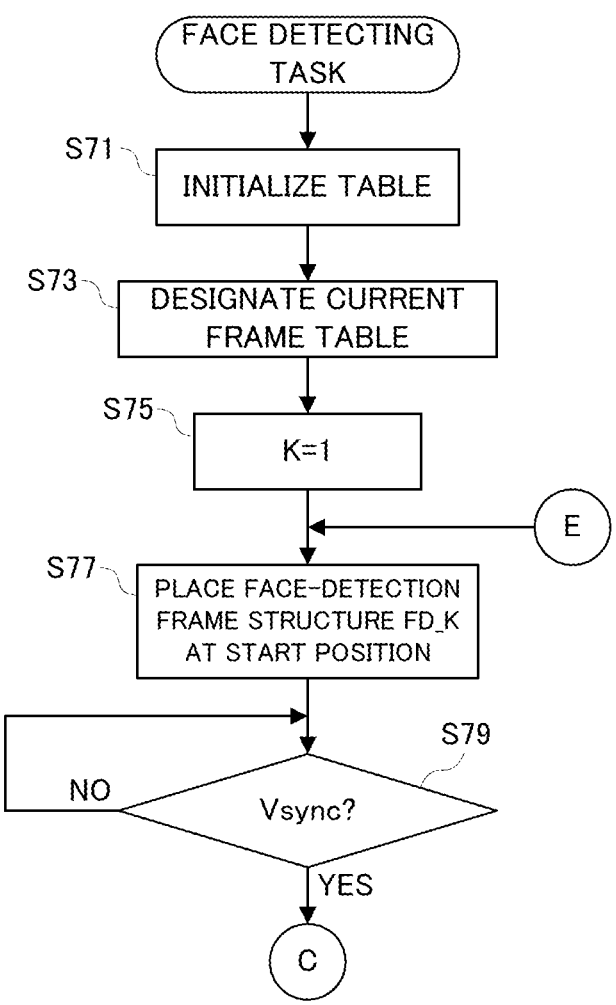
FIG. 19 is a flowchart showing another portion of behavior of the CPU applied to the embodiment in FIG. 2.
Figure 20:
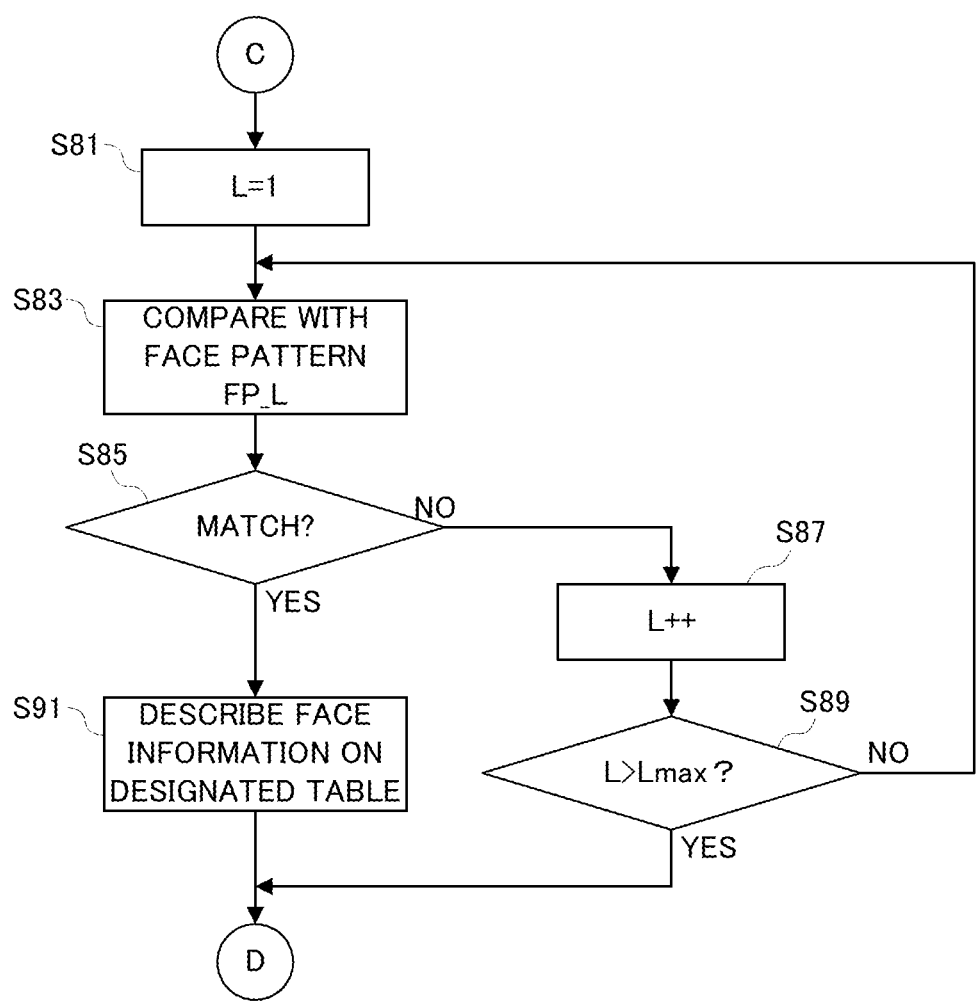
FIG. 20 is a flowchart showing still another portion of behavior of the CPU applied to the embodiment in FIG. 2.
Figure 21:
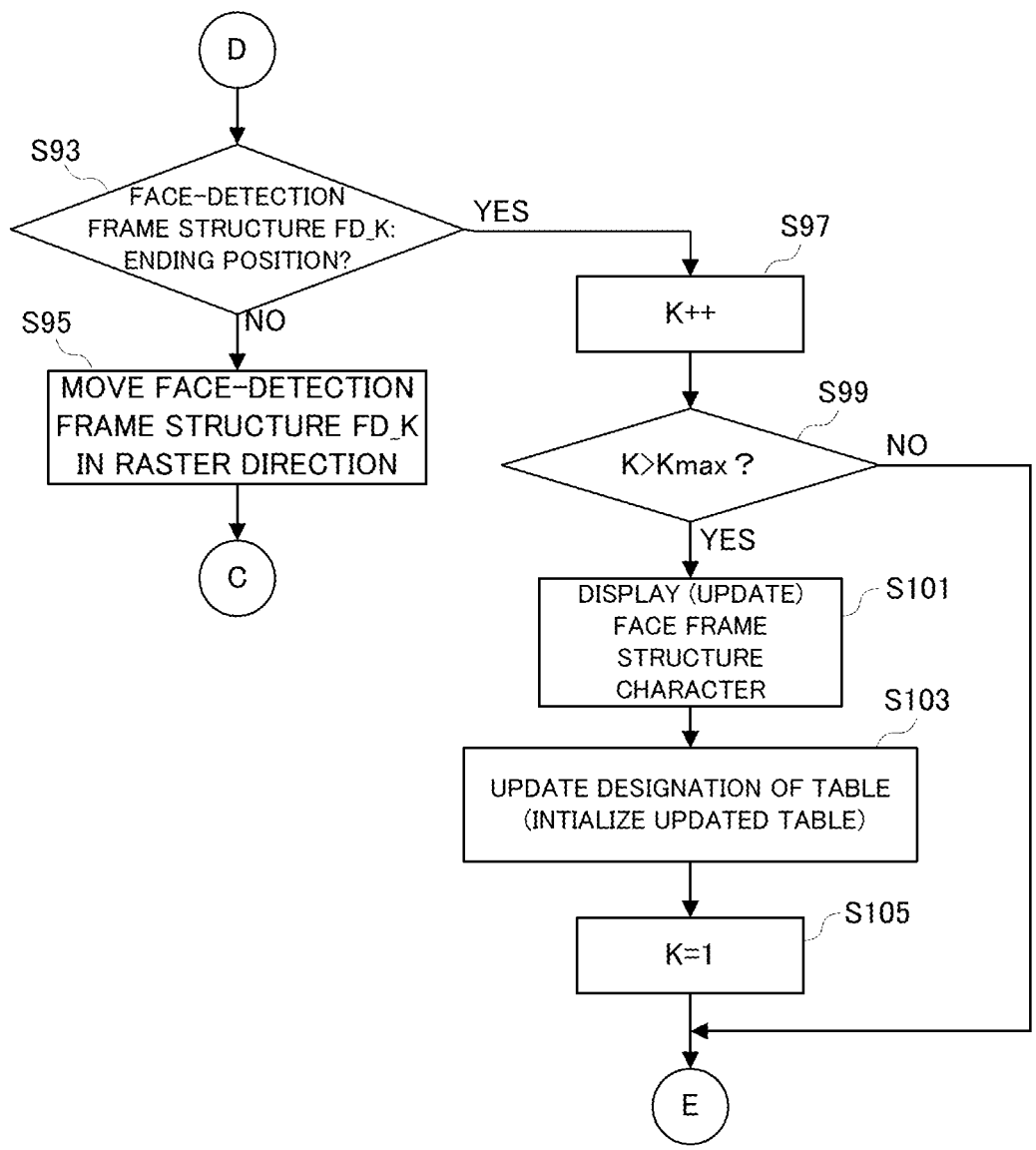
FIG. 21 is a flowchart showing yet another portion of behavior of the CPU applied to the embodiment in FIG. 2.
Figure 22:
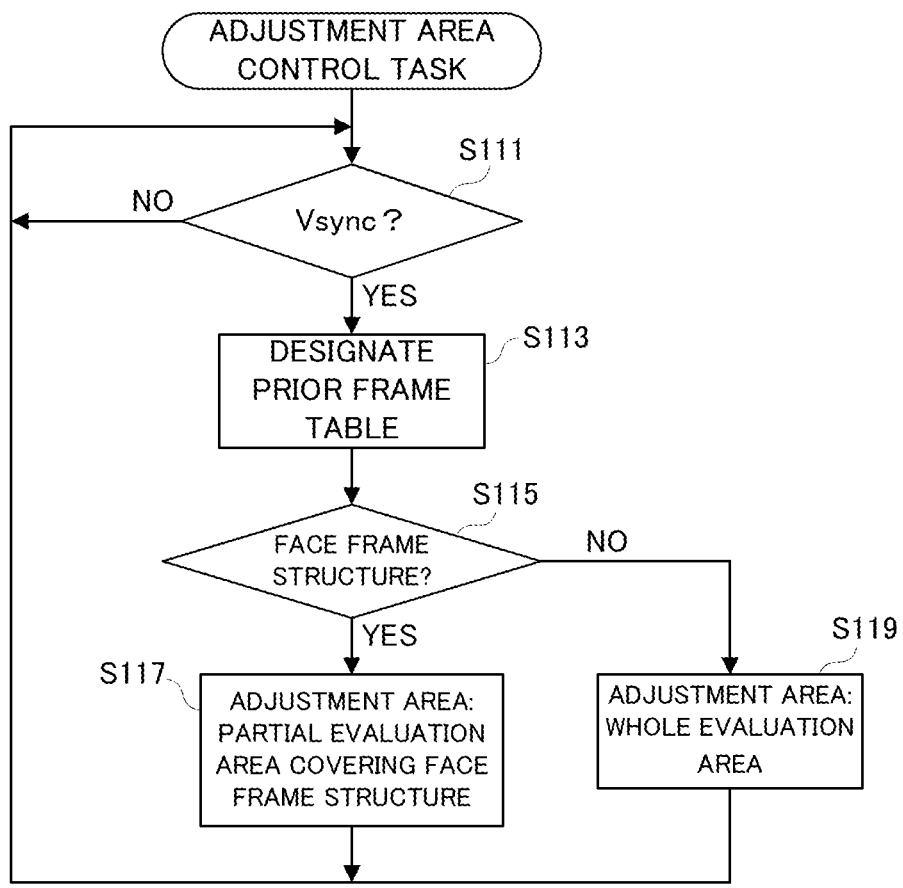
FIG. 22 is a flowchart showing another portion of behavior of the CPU applied to the embodiment in FIG. 2.
Figure 23:
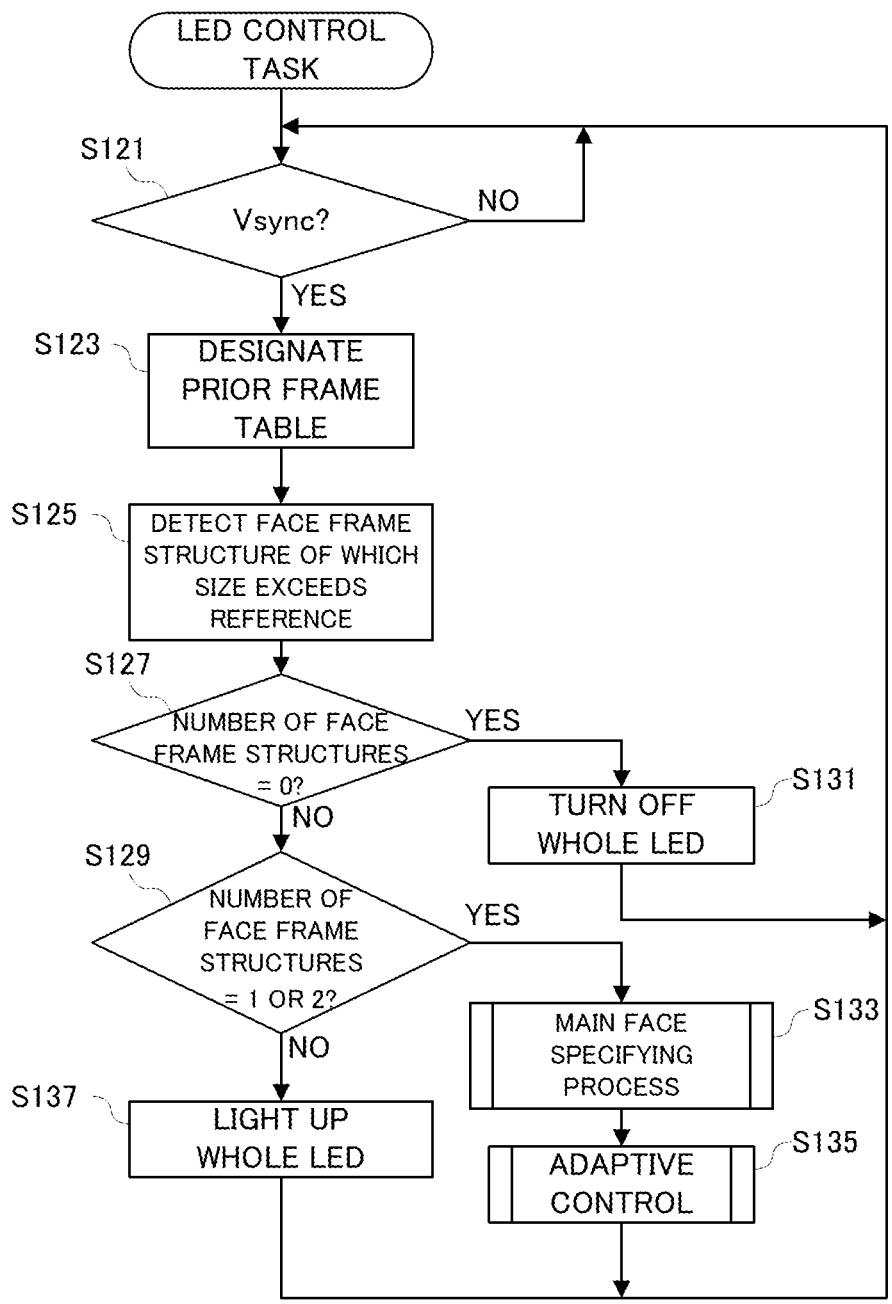
FIG. 23 is a flowchart showing still another portion of behavior of the CPU applied to the embodiment in FIG. 2.

The CPU 26 executes a plurality of tasks including the imaging task shown in FIG. 15 to FIG. 16, the continuous AF task shown in FIG. 17, the sub-LED control task shown in FIG. 18, the face detecting task shown in FIG. 19 to FIG. 21, the adjustment area control task shown in FIG. 22 and the LED control task shown in FIG. 23, in a parallel manner. A control program corresponding to these tasks are stored in a flash memory 48.

With reference to FIG. 15, in a step S1, the live view image process is executed. As a result, a live view image representing a scene is displayed on the LCD monitor 38. The face detecting task is started up in a step S3, the sub-LED control task is started up in a step S5, and the LED control task is started up in a step S7. Subsequently, the adjustment area control task is started up in a step S9, and the continuous AF task is started up in a step S11.

In a step S13, it is determined whether or not the shutter button 28s has been half depressed, and as long as NO is determined, the AE/AWB process for a live view image is repeated in a step S15. The AE/AWB process for a live view image is executed based on AE/AWB evaluation values belonging to the parameter adjustment area ADJ, and thereby, a brightness and a white balance of the live view image is adjusted approximately.

When YES is determined in the step S13, the adjustment area control task is stopped in a step S17, and the continuous AF task is stopped in a step S19. In a step S21, the AF process for recording is executed, and in a step S23, the AE process for recording is executed. The AF process for recording is executed based on AF evaluation values belonging to the parameter adjustment area ADJ, and the AE process for recording is executed based on AE/AWB evaluation values belonging to the parameter adjustment area ADJ. Thereby, a focus and a brightness of the live view image are adjusted strictly.

In a step S25, it is determined whether or not the shutter button 28s has been fully depressed, and in a step S27, it is determined whether or not an operation of the shutter button 28s has been cancelled. When YES is determined in the step S25, the process advances to a step S29, and when YES is determined in the step S27, the process returns to the step S9.

In the step S29, it is determined whether or not the strobe emitting device 44 needs to be driven, and when a determined result is NO, the process advances to a step S33 whereas when the determined result is YES, the process advances to the step S33 via a process in a step S31. In the step S31, the strobe emitting device 44 is driven.

In the step S33, the still-image taking process is executed. As a result, one frame of raw image data at a time point at which the shutter button 28s is fully depressed is taken into the raw image area 32a. In a step S35, the AWB process for recording is executed, and in a step S37, the recording process is executed. The AWB process for recording is executed based on AE/AWB evaluation values belonging to the parameter adjustment area ADJ. Thereby, a high-resolution scene image having an optimal white balance is recorded on the recording medium 42. In a step S39, the live-view image process is resumed, and thereafter, the process returns to the step S9.

With reference to FIG. 17, in a step S41, it is determined whether or not a vertical synchronization signal Vsync is generated. When a determined result is updated from NO to YES, in a step S43, it is determined whether or not the AF start-up condition is satisfied. When NO is determined, the process directly returns to the step S41 whereas when YES is determined, the process returns to the step S41 after executing the AF process for a live view image in a step S45.

A process of determining whether or not the AF start-up condition is satisfied is executed based on the AF evaluation values belonging to the parameter adjustment area ADJ, and the AF process for a live view image is also executed based on the AF evaluation values belonging to the parameter adjustment area ADJ. Thereby a focus of the live view image is adjusted continuously.

With reference to FIG. 18, in a step S51, it is determined whether or not the strobe emitting device 44 is expected to be driven, and when a determined result is NO, the process advances to a step S55 whereas when the determined result is YES, the process advances to the step S55 via a process in a step S53. In the step S53, the sub-LED device 50 is started to light up in order to give a notice of a strobe emission.

In the step S55, it is determined whether or not a camera shake is occurred, and when a determined result is NO, the process advances to a step S59 whereas when the determined result is YES, the process advances to the step S59 via a process in a step S57. In the step S57, the sub-LED) device 50 is started to blink in order to notify an occurrence of the camera shake.

In the step S59, it is determined whether or not the shutter button 28s has been fully depressed, and when a determined result is NO, in a step S61, it is determined whether or not a filly-depressed state of the shutter button 28s has been cancelled. When a determined result of the step S61 is NO, the process returns to the step S59, and when the determined result of the step S59 or S61 is updated to YES, the process advances to a step S63. In the step S63, the sub-LED device 50 in a lighting state or a blinking state is turned off.

With reference to FIG. 19, in a step S71, the tables IBL1 and TBL2 are initialized, and in a step S73, the table TBL1 is designated as a current frame table. In a step S75, a variable K is set to "1", and in a step S77, the face-detection frame structures FD_K is placed at a face-detection beginning position on an upper left of the evaluation area EVA.

It is noted that the current frame table is updated between the tables TBL1 and TBL2 by a process in a step S103 described later. Thus, in a subsequent frame, the current frame table is a prior frame table.

In a step S79, it is determined whether or not a vertical synchronization signal Vsync is generated, and when a determined result is updated from NO to YES, in a step S81, a variable L is set to "1". In a step S83, a partial image belonging to the face-detection frame structure FD_K is compared with a face pattern FP_L registered in the dictionary DIC, and in a step S85, it is determined whether or not the partial image of the face-detection frame structure FD_K is adapted to the face pattern FP_L.

When NO is determined, the variable L is incremented in a step S87, and in a step S89, it is determined whether or not the incremented variable L exceeds a constant Lmax (Lmax: the total number of face patterns registered in the dictionary DIC). Then, when L≤Lmax is established, the process returns to the step S83 whereas when L>Lmax is established, the process advances to a step S93.

When YES is determined in the step S85, the process advances to a step S91 so as to describe a current position and a size of the face-detection frame structure FD_K as face-frame-structure information. Upon completion of the process in the step S91, the process advances to the step S93.

In the step S93, it is determined whether or not the face-detection frame structures FD_K has reached a face-detection ending position on a lower right of the evaluation area EVA. When NO is determined, in a step S95, the face-detection frame structure FD_K is moved by a predetermined amount in a raster direction, and thereafter, the process returns to the step S81. On the other hand, when YES is determined in the step S93, the variable K is incremented in a step S97 and in a step S99, it is determined whether or not the incremented variable K exceeds "Kmax".

When K≤Kmax is established, the process returns to the step S77 whereas when K>Kmax is established, the process advances to a step S101. In a step S101, the LCD driver 36 is commanded to display a face-frame-structure character based on face-frame-structure information described on the current frame table. As a result, the face-frame-structure character is displayed on a live view image in an OSD manner. In the step S103, the designated table is updated and the updated designated table is initialized. Upon completion of the process in the step S103, in a step S105 the variable K is set to "1", and thereafter, the process returns to the step S77.

With reference to FIG. 22, in a step S111, it is determined whether or not the vertical synchronization signal Vsync is generated, and when a determined result is updated from NO to YES, in a step S113, the prior frame table is designated. In a step S115, it is determined whether or not a face frame structure is described in the prior frame table, and when YES is determined, the process advances to a step S117 whereas when NO is determined, the process advances to a step S119.

In the step S117, a partial divided area covering an area within the face frame structure which is described in the designated table, out of the 256 divided areas forming the evaluation area EVA, is defined as the parameter adjustment area ADJ. In the step S119, the whole evaluation area EVA is defined as the parameter adjustment area ADJ. Upon completion of the process in the step S117 or S119, the process returns to the step S111.

With reference to FIG. 23, in a step S121, it is determined whether or not the vertical synchronization signal Vsync is generated, and when a determined result is updated from NO to YES, in a step S123, the prior frame table is designated. In a step S125, a face frame structure of which size exceeds a reference is detected from the prior frame table.

In a step S127, it is determined whether or not the number of the face frame structures detected in the step S125 is zero, and when a determined result is YES, the process advances to a step S131 whereas when the determined result is NO, the process advances to a step S129. In a step S131, the I FD devices 46R, 46L and 46C are turned off, and thereafter, the process returns to the step S121.

In the step S129, it is determined whether or not the number of the face frame structures detected in the step S125 is one or two, and when a determined result is YES, the process advances to a step S133 whereas when the determined result is NO, in a step S137, the LED devices 46R, 46L and 46C are turned off. Upon completion of the process in the step S137, the process returns to the step S121 thereafter.

In the step S133, the main-face specifying process is executed in order to specify any of the face frame structures detected in the step S125 as a main face. In a step S135, based on a position of a main face or a sub face specified in the step S133 on the imaging surface, an adaptive control is executed on the LED devices 46R, 46L and 46C, and thereafter, the process returns to the step S121.

Figure 24:
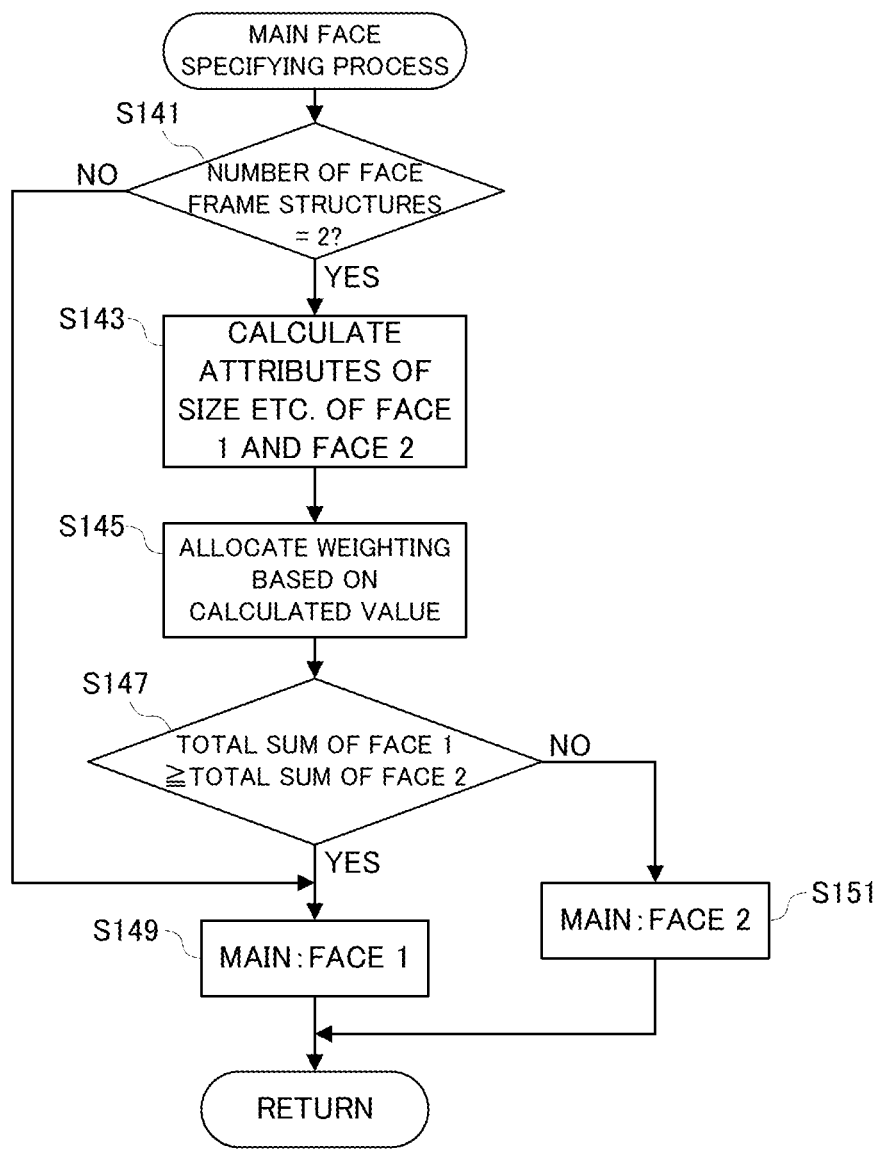
FIG. 24 is a flowchart showing yet another portion of behavior of the CPU applied to the embodiment in FIG. 2.

The main-face specifying process in the step S133 is executed according to a subroutine shown in FIG. 24. In a step S141, it is determined whether or not the number of the face frame structures detected in the step S125 is two, and when a determined result is NO, the process advances to a step S149 whereas when the determined result is YES, the process advances to a step S143.

In a step S143, in order to use as a determination reference of specifying a main face, calculated are a size of a face frame structure, a position of a face frame structure, a tilt of a face, a direction of a face and a smile degree with respect to each of a face 1 captured by the face frame structure KF1 and a face 2 captured by the face frame structure KF2. In a step S145, based on a relative ratio between a value calculated regarding the face 1 and a value calculated regarding the face 2, a weighting is allocated to each attribute.

In a step S147, it is determined whether or not a total sum of the weighting allocated to the face 1 is equal to or more than a total sum of the weighting allocated to the face 2, and when a determined result is YES, the process advances to the step S149 whereas when the determined result is NO, the process advances to a step S151.

In the step S149, the face 1 is specified as a main face, and in the step S151, the face 2 is specified as a main face. Upon completion of the process in the step S149 or S151, the process returns to the routine in an upper hierarchy.

Figure 25:
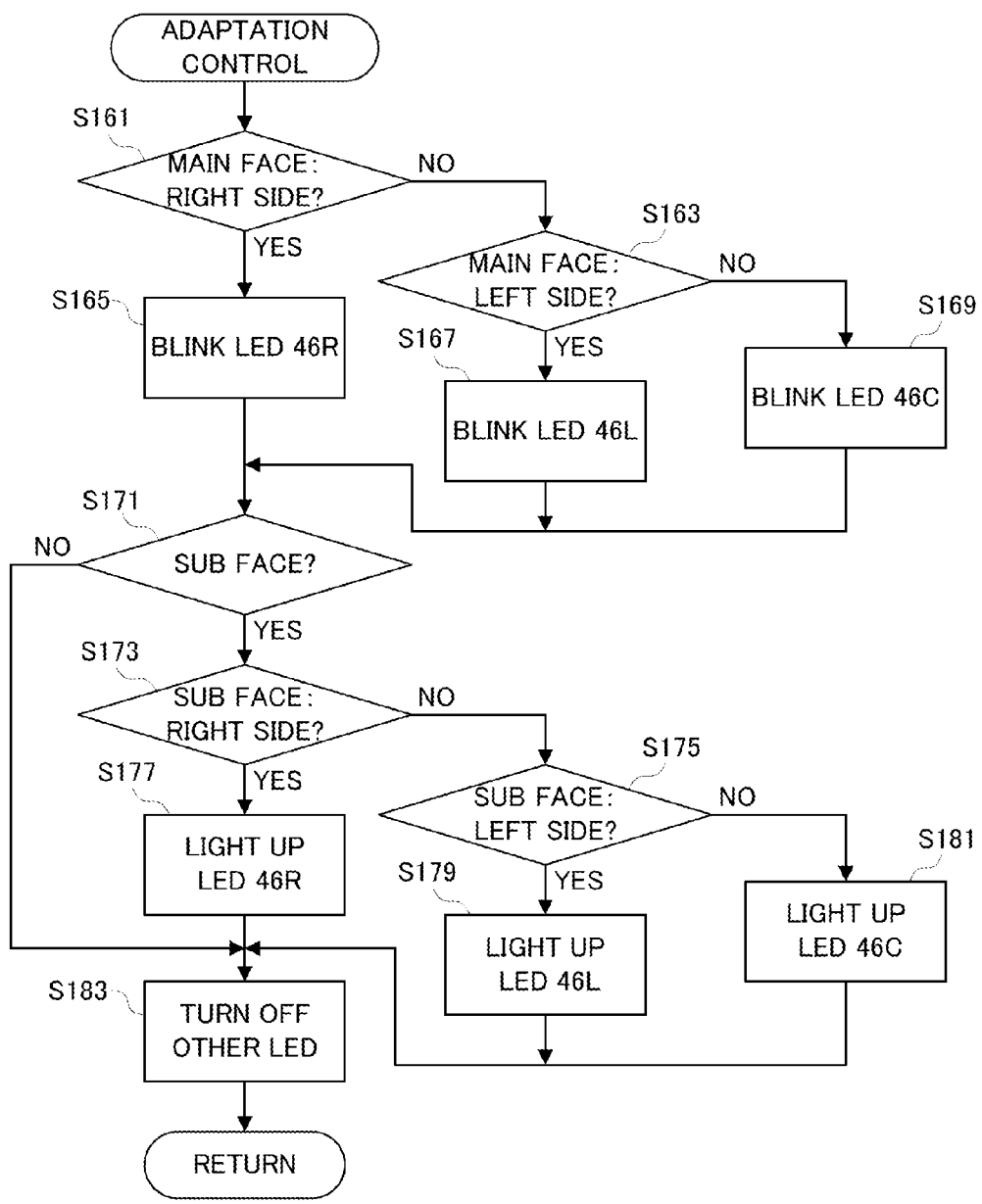
FIG. 25 is a flowchart showing another portion of behavior of the CPU applied to the embodiment in FIG. 2.

The adaptive control in the step S135 is executed according to a subroutine shown in FIG. 25. In a step S161, it is determined whether or not a main face is located on a right side from a face side to a surface extending in a vertical direction including an optical axis of the digital camera 10. When a determined result is YES, the process advances to a step S165 whereas when the determined result is NO, the process advances to a step S163.

In the step S163, it is determined whether or not a main face is located on a left side from a face side to the surface extending in the vertical direction including the optical axis of the digital camera 10. When a determined result is YES, the process advances to a step S167 whereas when the determined result is NO, the process advances to a step S169.

In the step S165, the LED device 46R is blinked, in the step S167, the LED device 46L is blinked, and in the step S169, the LED device 46C is blinked. Upon completion of the process in the step S165, S167 or S169, the process advances to a step S171.

In the step S171 it is determined whether or not a sub face exists except a main face, and when a determined result is NO, the process advances to a step S183 whereas when the determined result is YES, the process advances to a step S173.

In the step S173, it is determined whether or not a sub face is located on a right side from a face side to the surface extending in the vertical direction including the optical axis of the digital camera 10. When a determined result is YES, the process advances to a step S177 whereas when the determined result is NO, the process advances to a step S175.

In the step S175, it is determined whether or not a sub face is located on a left side from a face side to the surface extending in the vertical direction including the optical axis of the digital camera 10. When a determined result is YES, the process advances to a step S179 whereas when the determined result is NO, the process advances to a step S181.

In the step S177, the LED) device 46R is lit up, in the step S179, the LED) device 46L is lit up, and in the step S181, the LED device 46C is lit up. Upon completion of the process in the step S177, S179 or S181, the process advances to the step S183.

In the step S183, out of the LED devices 46R, 46L and 46C, an LED device which was not blinked or lit up in any of the steps S165 to S169 and S177 to S181 is turned off. Upon completion of the process in the step S183, the process returns to the routine in an upper hierarchy.

As can be seen from the above-described explanation, the imager 16 has an imaging surface capturing a scene and outputs a scene image. The LED device 46 generates a first notification toward the scene. The CPU 26 searches for one or at least two face images each having a size exceeding a reference from the scene image outputted from the imager 16, and controls a generation manner of the LED device 46 with reference to an attribute of each of the detected one or at least two face images.

When one or at least two persons including an operator him/herself is photographed (so-called self shooting), one or at least two face images are appeared in the scene image. According to the present invention, the generation manner of the first notification toward the scene is controlled with reference to an attribute of each of the face images. It becomes possible for the operator to comprehend a composition by the generation manner of the first notification, and thereby, an operability of the self shooting.

It is noted that, in this embodiment, the I FD device 46R, 46L or 46C is blinked based on a position of a main face on the imaging surface and is lit up based on a position of a sub face on the imaging surface so as to distinguish a notification regarding the main face from a notification regarding the sub face. However, an LED capable of emitting light in two colors for each of the LED devices 46R, 46L and 46C may be used so as to distinguish the notification regarding the main face from the notification regarding the sub face according to a difference of emission colors.

Figure 26:
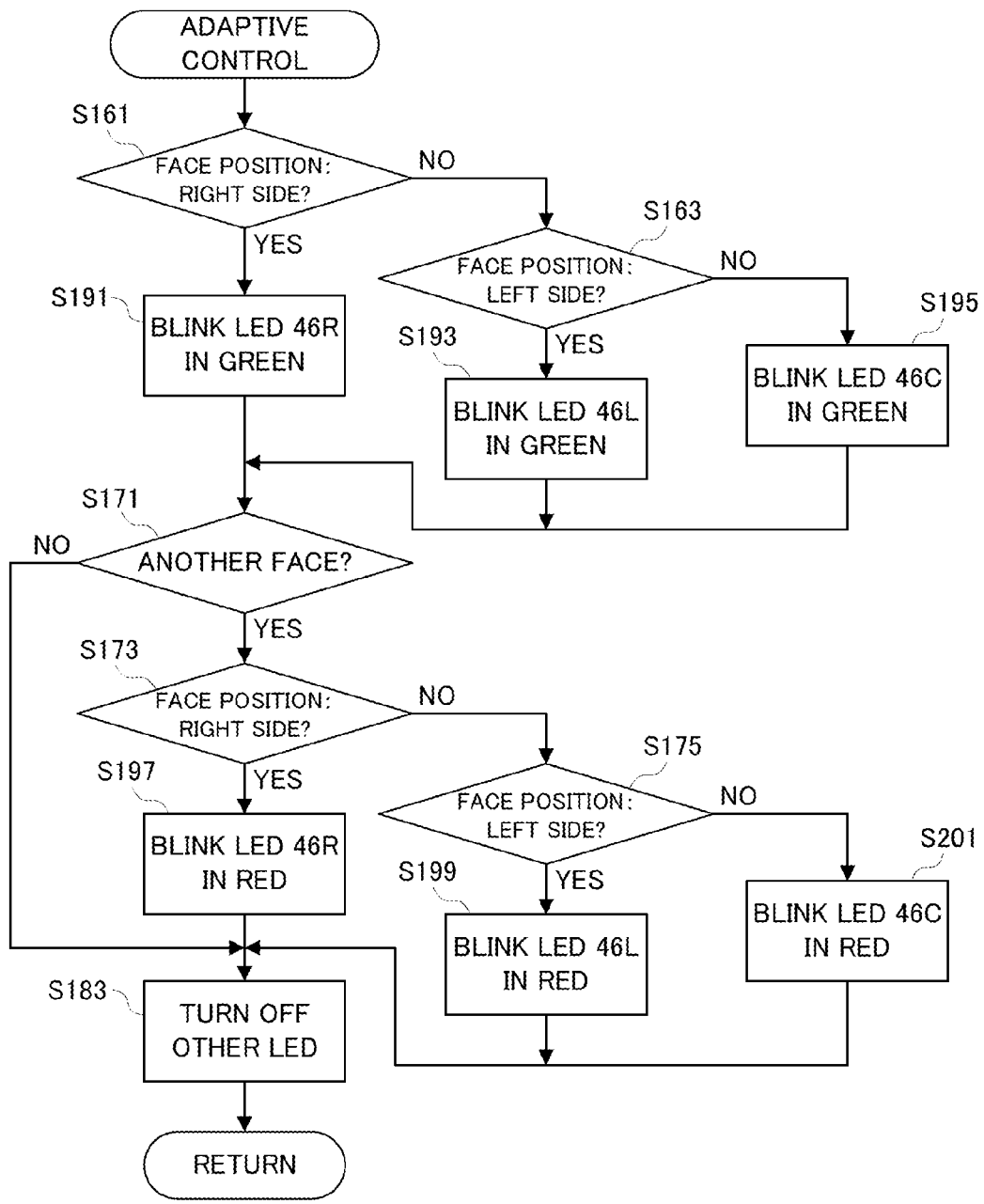
FIG. 26 is a flowchart showing one portion of behavior of the CPU applied to another embodiment in FIG. 2.

In this case, steps S191 to S195 shown in FIG. 26 are respectively executed instead of the steps S165 to S169 shown in FIG. 25, and steps S197 to S201 shown in FIG. 26 are respectively executed instead of the steps S177 to S181 shown in FIG. 25.

In the step S191, the LED device 46R is emitted light in green, in the step S193, the LED device 46L is emitted light in green, and in the step S195, the LED device 46C is emitted light in green. In the step S197, the LED device 46R is emitted light in red, in the step S199, the LED device 46L is emitted light in red, and in the step S201, the LED device 46C is emitted light in red.

Figure 27:
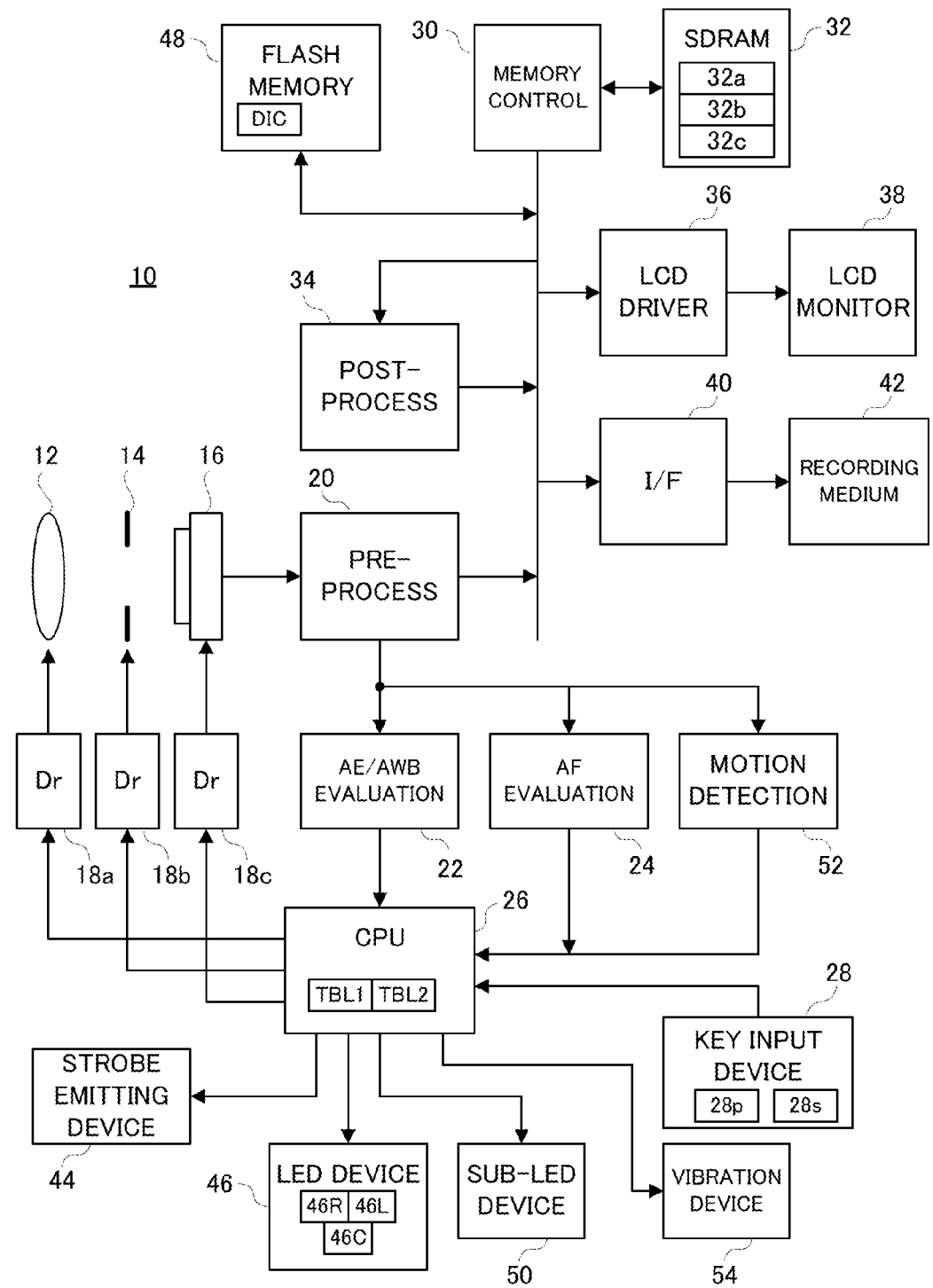
FIG. 27 is a block diagram showing a configuration of another embodiment of the present invention.

Moreover, in this embodiment, based on the number of face frame structures detected from raw image data accommodated in the raw image area 32a, a light-emission manner of the LED device 46R, 46L or 46C is changed. However, a vibration device 54 may be arranged in the digital camera 10 as shown in FIG. 27 so as to change a vibration manner of the vibration device 54 based on the detected face frame structures.

Figure 28:
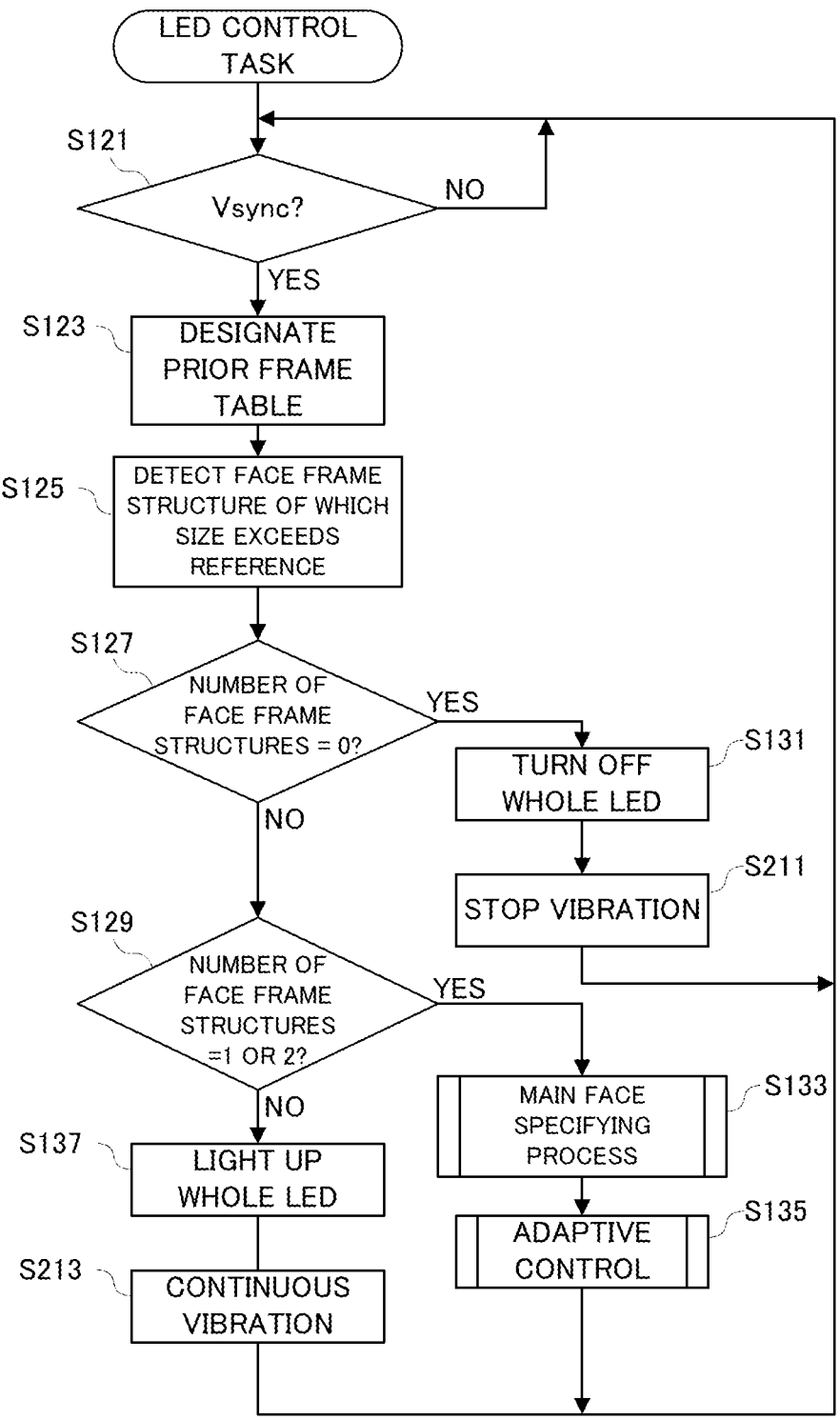
FIG. 28 is a flowchart showing one portion of behavior of a CPU applied to the embodiment in FIG. 27.

In this case, a process in a step S211 shown in FIG. 28 is executed between the steps S131 and S121 shown in FIG. 23, and a process in a step S213 shown in FIG. 28 is executed between the steps S137 and S121 shown in FIG. 23. Moreover, when the determined result of the step S141 shown in FIG. 24 is NO, a process in a step S215 shown in FIG. 29 is executed before the process in the step S149 whereas when the determined result is YES, a process in a step S217 shown in FIG. 29 is executed before the process in the step S143.

With reference to FIG. 28, in the step S211, a vibration of the vibration device 54 is stopped. In the step S213, the vibration device 54 is continuously vibrated.

Figure 29:
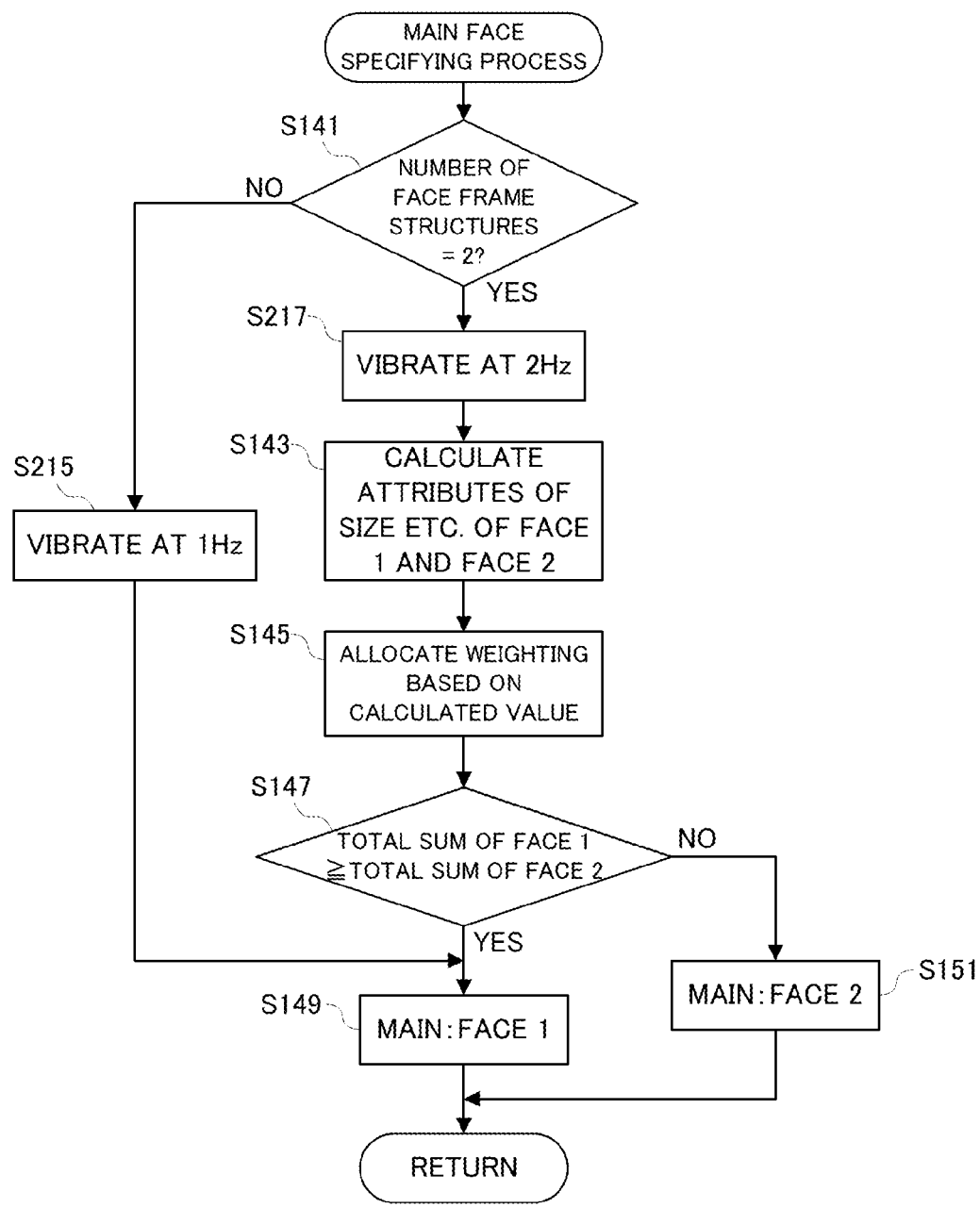
FIG. 29 is a flowchart showing another portion of behavior of the CPU applied to the embodiment in FIG. 27.

With reference to FIG. 29, in the step S215, the vibration device 54 is vibrated at a cycle of 1 Hz. In the step s217, the vibration device 54 is vibrated at a cycle of 2 Hz.

Moreover, in this embodiment, the sub-LED device 50 is installed on a front of the camera housing CB1 so as to light up corresponding to an expectation of a strobe emission and blink corresponding to an occurrence of a camera shake. However, a sub-LED device may be added so as to emit light LED devices respectively different in association with the expectation of the strobe emission and the occurrence of the camera shake.

Figure 30:
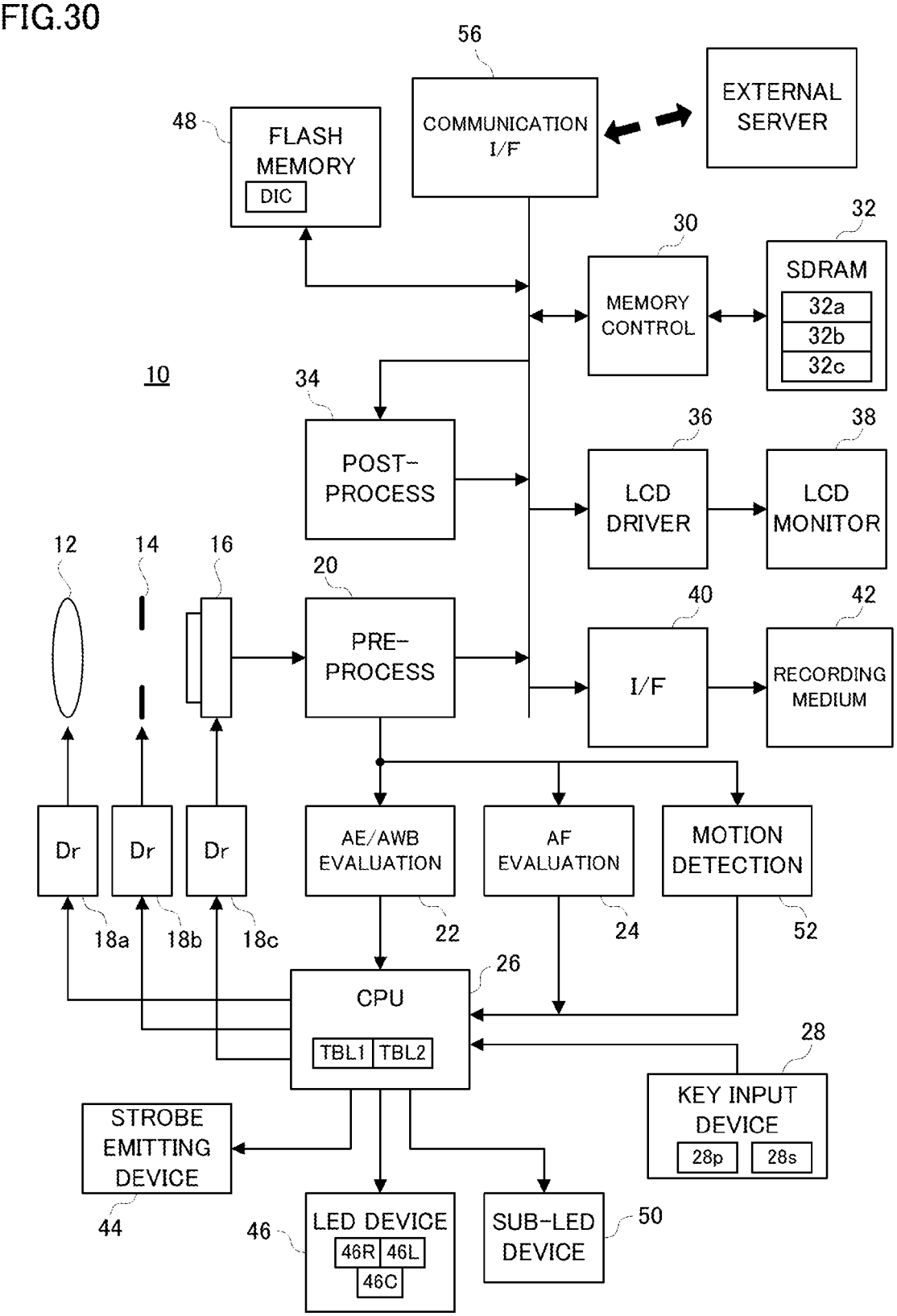
FIG. 30 is a block diagram showing a configuration of still another embodiment of the present invention.

Moreover, the control programs equivalent to the multi task operating system and the plurality of tasks executed thereby are previously stored in the flash memory 48. However, a communication I/F 56 may be arranged in the digital camera 10 as shown in FIG. 30 so as to initially prepare a part of the control programs in the flash memory 48 as an internal control program whereas acquire another part of the control programs from an external server as an external control program In this case, the above-described procedures are realized in cooperation with the internal control program and the external control program.

Moreover, in this embodiment, the processes executed by the CPU 26 are divided into a plurality of tasks including the imaging task shown in FIG. 15 to FIG. 16, the continuous AF task shown in FIG. 17, the sub-LED control task shown in FIG. 18, the face detecting task shown in FIG. 19 to FIG. 21, the adjustment area control task shown in FIG. 22 and the LED control task shown in FIG. 23. However, these tasks may be further divided into a plurality of small tasks, and furthermore, a part of the divided plurality of small tasks may be integrated into the main task. Moreover, when a transferring task is divided into the plurality of small tasks, the whole task or a part of the task may be acquired from the external server.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An electronic camera, comprising:
   an imager which outputs an electronic image corresponding to an optical image captured on an imaging surface;
   a first generator which generates a first notification forward of the imaging surface;
   a memory; and
   a processor configured to execute
      a searching code which searches for one or at least two face images each having a size exceeding a reference from the electronic image outputted from said imager; and
      a control code which controls a generation manner of said first generator with reference to an attribute of each of one or at least two face images detected by said searching code,
   wherein said first generator includes a plurality of light-emitting elements arranged in a front of said camera housing, and said control code includes a position detecting code which detects a position of each of the one or at least two face images as a part of the attribute and a light emitting code which activates one or at least two light-emitting elements respectively corresponding to one or at least two positions detected by said position detecting code, out of said plurality of light-emitting elements.

2. An electronic camera according to claim 1, wherein said control code further includes an allocating code which allocates an order to the one or at least two face images, and said light emitting code activates each of the one or at least two light-emitting elements in a manner different depending on the order allocated by said allocating code.

3. An electronic camera according to claim 2, wherein said allocating code allocates the order based on at least one of a size, a position, a tilt, a direction and a smile degree of the face image when the number of the face image is equal to or more than two.

4. An electronic camera according to claim 2, wherein each of the plurality of light-emitting elements emits light in any of a plurality of hues based on an activating process of said light emitting code, and said light emitting code activates each of the one or at least two light-emitting elements in a hue different depending on the order allocated by said allocating code.

5. An electronic camera according to claim 1, further comprising:
   a second generator which generates a second notification forward of the imaging surface; and
   said processor configured to execute
      a detecting code which detects a camera shake; and
      a driving code which drives said second generator in response to a detection of said detecting code.

6. An electronic camera according to claim 1, further comprising
   a third generator which generates a third notification by vibrating a camera housing; and
   said processor configured to execute
      a changing code which changes a cycle of a vibration generated by said third generator corresponding to the number of the face images detected by said searching code.

7. An imaging control program recorded on a non-transitory recording medium in order to control an electronic camera provided with an imager which outputs an electronic image corresponding to an optical image captured on an imaging surface, and a first generator which generates a first notification forward of the imaging surface, said program causing a processor of the electronic camera to perform the steps comprises:
   a searching step of searching for one or at least two face images each having a size exceeding a reference from the electronic image outputted from said imager; and
   a controlling step of controlling a generation manner of said first generator with reference to an attribute of each of one or at least two face images detected by said searching step,
   wherein said first generator includes a plurality of light-emitting elements arranged in a front of said camera housing, and said control step includes a position detecting step of detecting a position of each of the one or at least two face images as a part of the attribute and a light emitting step of activating one or at least two light-emitting elements respectively corresponding to one or at least two positions detected by said position detecting step, out of said plurality of light-emitting elements.

8. An imaging control method executed by an electronic camera provided with an imager which outputs an electronic image corresponding to an optical image captured on an imaging surface, and a first generator which generates a first notification forward of the imaging surface, comprising:
   a searching step of searching for one or at least two face images each having a size exceeding a reference from the electronic image outputted from said imager; and
   a controlling step of controlling a generation manner of said first generator with reference to an attribute of each of one or at least two face images detected by said searching step,
   wherein said first generator includes a plurality of light-emitting elements arranged in a front of said camera housing, and said control step includes a position detecting step of detecting a position of each of the one or at least two face images as a part of the attribute and a light emitting step of activating one or at least two light-emitting elements respectively corresponding to one or at least two positions detected by said position detecting step, out of said plurality of light-emitting elements.

* * * * *